US012482478B2

(12) United States Patent
Qin et al.

(10) Patent No.: US 12,482,478 B2
(45) Date of Patent: Nov. 25, 2025

(54) METHOD AND APPARATUS FOR IMPROVING SOUND QUALITY OF SPEAKER

(71) Applicant: HUAWEI TECHNOLOGIES CO., LTD., Guangdong (CN)

(72) Inventors: Peng Qin, Hangzhou (CN); Yiwei Kou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 18/390,769

(22) Filed: Dec. 20, 2023

(65) Prior Publication Data

US 2024/0135946 A1 Apr. 25, 2024

Related U.S. Application Data

(63) Continuation of application No. PCT/CN2022/101678, filed on Jun. 27, 2022.

(30) Foreign Application Priority Data

Jun. 30, 2021 (CN) ......................... 202110745517.3

(51) Int. Cl.
*G10L 21/02* (2013.01)
*H04R 3/04* (2006.01)

(52) U.S. Cl.
CPC ................ *G10L 21/02* (2013.01); *H04R 3/04* (2013.01); *H04R 2430/01* (2013.01)

(58) Field of Classification Search
CPC ....... G10L 21/02; H04R 3/04; H04R 2430/01; H04R 29/003; H04R 2430/03; H04R 3/00;
(Continued)

(56) References Cited

U.S. PATENT DOCUMENTS 7,031,474 B1 * 4/2006 Yuen ....................... H04S 1/005 381/1
10,199,048 B2 * 2/2019 Christoph ................ H04R 3/04
(Continued)

FOREIGN PATENT DOCUMENTS

CN 103329570 B 2/2018
CN 106165445 B 10/2020
CN 112533115 A 3/2021

*Primary Examiner* — Xu Mei
(74) *Attorney, Agent, or Firm* — WOMBLE BOND DICKINSON (US) LLP

(57) ABSTRACT

A method for improving sound quality of a speaker includes: performing frequency division on an input signal of the speaker to obtain a first low-frequency input signal and a first high-frequency input signal, where the input signal is a time domain signal; performing transient detection on the first low-frequency input signal to determine whether the first low-frequency input signal is a transient signal; if the first low-frequency input signal is a transient signal, performing signal envelope modulation on the first low-frequency input signal to obtain a second low-frequency input signal; determining an output signal of the speaker based on the second low-frequency input signal and the first high-frequency input signal, where a startup voltage of the second low-frequency input signal is higher than a startup voltage of the first low-frequency input signal, and loudness of the second low-frequency input signal is greater than loudness of the first low-frequency input signal.

20 Claims, 18 Drawing Sheets

FIG. 6

(58) Field of Classification Search

CPC . H04R 3/007; H04R 1/22; H04R 9/06; H03G 5/165; H03G 9/025; H04M 1/6016; H04M 1/725

USPC ........................................ 381/59, 96, 98, 99

See application file for complete search history.

(56) References Cited

U.S. PATENT DOCUMENTS

| | | | | |
|---|---|---|---|---|
| 11,956,607 | B2 * | 4/2024 | Kou ..................... | H04R 29/001 |
| 12,363,478 | B2 * | 7/2025 | Lopez Zuleta .......... | H04R 3/04 |
| 2006/0126851 | A1 | 6/2006 | Yuen et al. | |
| 2006/0274903 | A1 * | 12/2006 | Aoki ........................ | H04R 3/00 381/56 |
| 2009/0276069 | A1 | 11/2009 | Rogers | |
| 2010/0086148 | A1 * | 4/2010 | Hung ..................... | H03G 5/165 381/98 |
| 2011/0044471 | A1 | 2/2011 | Aarts et al. | |
| 2013/0163784 | A1 * | 6/2013 | Tracey ..................... | H04R 3/04 381/103 |
| 2015/0139429 | A1 * | 5/2015 | Gautama ................ | H04R 3/007 381/55 |

* cited by examiner

METHOD AND APPARATUS FOR IMPROVING SOUND QUALITY OF SPEAKER

CROSS-REFERENCE TO RELATED APPLICATIONS

This application is a continuation of International Application No. PCT/CN2022/101678, filed on Jun. 27, 2022, which claims priority to Chinese Patent Application No. 202110745517.3, filed on Jun. 30, 2021, the disclosures of which are hereby incorporated by reference in their entirety.

TECHNICAL FIELD

Embodiments of this application relate to the field of media technologies, and in particular, to a method and an apparatus for improving sound quality of a speaker.

BACKGROUND

As multimedia devices are developing toward miniaturization and portability, sizes of speakers embedded in these multimedia devices are strictly limited. Speakers in many multimedia devices are micro speakers, and low-frequency playback capabilities of the micro speakers are poor.

Currently, low- and medium-frequency loudness of audio signals played by most speakers is insufficient. Therefore, when the speakers play the audio signals, sound quality is poor. For a user, low- and medium-frequency signals in audio signals play an important role in auditory perception, and directly affect the auditory perception of the user. Therefore, how to improve low-frequency sound effect of a micro speaker is a problem that needs to be urgently resolved.

SUMMARY

Embodiments of this application provide a method and an apparatus for improving sound quality of a speaker, to improve low-frequency sound effect of the speaker and improve sound quality of the speaker.

To achieve the foregoing objective, the following technical solutions are used in the embodiments of this application:

According to a first aspect, an embodiment of this application provides a method for improving sound quality of a speaker. The method may be applied to an electronic device having an audio playing function. The method includes the following operations: The electronic device performs frequency division on an input signal of the speaker to obtain a first low-frequency input signal and a first high-frequency input signal, where the input signal of the speaker is a time domain signal, the first low-frequency input signal includes a signal whose frequency is lower than a first preset frequency in the input signal, and the first high-frequency input signal includes a signal whose frequency is higher than the first preset frequency in the input signal; the electronic device performs transient detection on the first low-frequency input signal to determine whether the first low-frequency input signal is a transient signal, and if the first low-frequency input signal is a transient signal, performs signal envelope modulation on the first low-frequency input signal to obtain a second low-frequency input signal; and then the electronic device determines an output signal of the speaker based on the second low-frequency input signal and the first high-frequency input signal, where a startup voltage of the second low-frequency input signal is higher than a startup voltage of the first low-frequency input signal, and loudness of the second low-frequency input signal is greater than loudness of the first low-frequency input signal.

In the method for improving sound quality of a speaker according to this embodiment of this application, transient detection is performed on the low-frequency signal in the input signal; and if the input signal is a transient signal, envelope modulation is used to enhance the transient signal. When the speaker plays a segment of an audio signal, sound quality of a low-frequency signal in the audio signal played by the speaker is related to performance of the speaker, and a transient signal in the low-frequency signal usually reflects important information of the audio signal. Therefore, the transient signal in the low-frequency signal is modulated to improve loudness of the low-frequency transient signal, and a dynamic range of the low-frequency transient signal is adjusted, so that when the speaker plays the processed audio signal, low-frequency sound effect of the audio signal is good, that is, sound quality of the speaker can be improved by using the technical solution in this embodiment of this application.

In an embodiment, the method for improving sound quality of a speaker according to this embodiment of this application further includes: the electronic device performs frequency division on the first high-frequency input signal of the speaker to obtain a first intermediate-frequency input signal and a second high-frequency input signal, where the first intermediate-frequency input signal includes a signal whose frequency is lower than a second preset frequency in the first high-frequency input signal, the second high-frequency input signal includes a signal whose frequency is higher than the second preset frequency in the first high-frequency input signal, and the second preset frequency is higher than the first preset frequency; and the electronic device performs transient detection on the first intermediate-frequency input signal to determine whether the first intermediate-frequency input signal is a transient signal, and if the first intermediate-frequency input signal is a transient signal, performs signal envelope modulation on the first intermediate-frequency input signal to obtain a second intermediate-frequency input signal, where a startup voltage of the second intermediate-frequency input signal is higher than a startup voltage of the first intermediate-frequency input signal, and loudness of the second intermediate-frequency input signal is greater than loudness of the first intermediate-frequency input signal.

A method for determining the output signal of the speaker based on the second low-frequency input signal and the first high-frequency input signal includes: the electronic device obtains the output signal of the speaker based on the second low-frequency input signal, the second intermediate-frequency input signal, and the second high-frequency input signal.

In this embodiment of this application, transient detection is also performed on the intermediate-frequency signal in the input signal, and envelope modulation is performed on the transient signal, to enhance the intermediate-frequency signal, thereby improving overall sound quality of the speaker.

In an embodiment, the first low-frequency input signal is a transient signal, and before the performing signal envelope modulation on the first low-frequency input signal, the method for improving sound quality of a speaker according to this embodiment of this application further includes: the electronic device generates a low-frequency auxiliary signal, and adds the low-frequency auxiliary signal to the first low-frequency input signal to obtain a first auxiliary enhanced signal.

Based on this, a method for performing signal envelope modulation on the first low-frequency input signal to obtain the second low-frequency input signal includes: performing signal envelope modulation on the first auxiliary enhanced signal to obtain the second low-frequency input signal.

In this embodiment of this application, the first low-frequency input signal is a transient signal, and the speaker of the electronic device is a micro speaker. If a low-frequency playback capability of the speaker is weak, the low-frequency auxiliary signal may be added to the first low-frequency input signal. A function of the low-frequency auxiliary signal is to assist in enhancing loudness of the first low-frequency input signal and optimize a dynamic range of the first low-frequency input signal.

In an embodiment, a method for generating the low-frequency auxiliary signal includes: generating a first auxiliary signal, and performing high-pass filtering on the first auxiliary signal to obtain the low-frequency auxiliary signal. The first auxiliary signal meets: $signal\_h=e^{-A}\times\sin(2\pi f)$, where signal_h represents the low-frequency auxiliary signal, A represents a signal amplitude influencing factor, and f is a center frequency of the speaker. A value range of A may be 10 to 50, and a specific value may be determined by a system or set by a user, for example, may be 10, 25, or 50. A value range of f may be a range of 50 Hz to 150 Hz, and a specific value may be determined by the system or set by the user. For example, a value of f may be 50 Hz, 100 Hz, or 150 Hz.

In an embodiment, the first low-frequency input signal is a transient signal, and before the performing signal envelope modulation on the first low-frequency input signal, the method for improving sound quality of a speaker according to this embodiment of this application further includes: the electronic device performs phase compensation on the first low-frequency input signal to obtain a first phase-compensated signal.

Based on this, the method for performing signal envelope modulation on the first low-frequency input signal to obtain the second low-frequency input signal includes: the electronic device performs signal envelope modulation on the first phase-compensated signal to obtain the second low-frequency input signal.

In this embodiment of this application, in the process of performing frequency division and auxiliary enhancement on the input signal by the electronic device, a phase of the first low-frequency input signal may be affected. Consequently, a deviation is caused to the phase of the low-frequency input signal, and the phase is no longer a linear phase. Therefore, necessary linear phase compensation is performed on the first low-frequency input signal, to correct the phase of the first low-frequency input signal to the linear phase, thereby ensuring low-frequency sound quality.

In an embodiment, a method for performing transient detection on the first low-frequency input signal to determine whether the first low-frequency input signal is a transient signal includes: the electronic device determines transient power and steady-state power of the first low-frequency input signal, determines an instantaneous rate of the first low-frequency input signal based on the transient power and the steady-state power of the first low-frequency input signal, and if a transient rate of the input signal is greater than a preset transient rate threshold, determines that the first low-frequency input signal is a transient signal. The instantaneous rate of the first low-frequency input signal meets: $T_r=(R_r-1)^2\times W$, where $T_r$ represents the instantaneous rate of the first low-frequency input signal, $R_r$ represents a ratio of the transient power of the first low-frequency input signal to the steady-state power of the first low-frequency input signal, W represents a weighting factor, and a value of W is the same as current power of the first low-frequency input signal.

In this embodiment of this application, the power of the first low-frequency input signal is an average value obtained based on a quadratic sum of voltage values of all data points included in the first low-frequency input signal. The transient power of the first low-frequency input signal may be average power of n1 consecutive signal frames before a current frame, and the steady-state power of the first low-frequency input signal may be average power of n2 consecutive signal frames before the current frame.

In some embodiments, to avoid false detection of small signals, some small signals may be masked. In an embodiment, a masking threshold is set, and when the power of the first low-frequency input signal is less than the masking threshold, the masking threshold is used as the power of the first low-frequency input signal. In other words, $P_d=\max(P_d, P_{th})$, where $P_d$ represents the power of the first low-frequency input signal, and $P_{th}$ represents the masking threshold. Similarly, the ratio of the transient power of the first low-frequency input signal to the steady-state power of the first low-frequency input signal may also be optimized as follows: $R_r=\max(R_r, 1)$.

In an embodiment, after the electronic device obtains the first low-frequency input signal, the electronic device may perform low-pass filtering on the first low-frequency input signal, and then calculate transient power and steady-state power of the filtered first low-frequency input signal, to further determine whether the first low-frequency input signal is a transient signal or a steady-state signal. In this embodiment of this application, low-pass filtering is performed on the first low-frequency input signal to obtain a low-frequency input signal within a lower frequency range, and a high-frequency signal that may exist in the first low-frequency input signal may be further reduced through the low-pass filtering. On this basis, transient detection is performed on the filtered first low-frequency input signal, so that a false detection rate of transient detection can be reduced.

In an embodiment, the method for improving sound quality of a speaker according to this embodiment of this application further includes: the electronic device performs equalization processing on a first signal to obtain a second signal, where the first signal is an initial to-be-played signal that is input to the speaker; and the electronic device processes the second signal by using a bass enhancement algorithm, to obtain the input signal of the speaker.

In this embodiment of this application, a specific method for performing equalization processing on the first signal may be: performing equalization processing on the first signal by using a biquard filter, to improve a low-frequency response of the speaker. The second signal is processed by using the bass enhancement algorithm, so that low-frequency loudness of the second signal can be improved.

In an embodiment, a method for processing the second signal by using the bass enhancement algorithm, to obtain the input signal of the speaker includes: the electronic device determines a gain of a low-frequency shelving filter based on energy of a low-frequency signal in the second signal, where the low-frequency shelving filter is configured to control loudness of the low-frequency signal in the second signal; and the electronic device filters the second signal by using the low-frequency shelving filter, to obtain the input signal of the speaker.

By using the bass enhancement algorithm, the electronic device differentially enhances, based on the energy of the low-frequency signal in the second signal, loudness of low-frequency signals with different energy to different degrees. To be specific, different gains are set for the low-frequency signals based on the energy of the low-frequency signals, that is, the loudness of the low-frequency signal in the second signal is dynamically and adaptively improved based on an energy characteristic of the low-frequency signal in the second signal. In this way, clarity of the low-frequency signal can be improved.

In an embodiment, the method for improving sound quality of a speaker according to this embodiment of this application further includes: the electronic device obtains a first displacement prediction model including one or more correction coefficients, where the first displacement prediction model is used to simulate performance of the speaker to predict a displacement of a diaphragm of the speaker, and the one or more correction coefficients are used to control an output of the first displacement prediction model; the electronic device adjusts at least one correction coefficient in the first displacement prediction model to obtain a second displacement prediction model, where an absolute value of a difference between a predicted displacement output by the second displacement prediction model and an actual displacement of the diaphragm of the speaker is less than an absolute value of a difference between a predicted displacement output by the first displacement prediction model and the actual displacement of the diaphragm of the speaker, and the actual displacement of the speaker is an actual measured value of a movement distance of the diaphragm relative to an initial location; and the electronic device controls a gain of the output signal of the speaker based on a displacement protection threshold of the speaker and the predicted displacement output by the second displacement prediction model, so that a displacement of the diaphragm when the speaker plays the output signal is less than or equal to the displacement protection threshold, where the displacement protection threshold is a maximum displacement of the diaphragm of the speaker.

In this embodiment of this application, the second displacement prediction model reflects a feature of the speaker more truly, ensures that the output predicted displacement is more accurate, and can further perform displacement protection more accurately. In this way, hardware potentials of the speaker are maximally exploited and loudness of the speaker is improved, while the displacement of the diaphragm of the speaker is protected.

In an embodiment, the method for improving sound quality of a speaker according to this embodiment of this application further includes: the electronic device performs virtual bass processing on the output signal to obtain a virtual bass output signal, where psychologically perceived low-frequency loudness of the virtual bass output signal is greater than psychologically perceived low-frequency loudness of the output signal of the speaker.

In this embodiment of this application, the virtual bass processing is a method for improving bass sound effect based on psychoacoustics. Measured from a perspective of psychoacoustics, psychologically perceived low-frequency loudness of an output signal after the virtual bass processing (that is, the virtual bass output signal) is greater than psychologically perceived low-frequency loudness of the original output signal. In an embodiment, the psychologically perceived low-frequency loudness may be determined based on a psychoacoustic model.

In an embodiment, a method for performing virtual bass processing on the output signal of the speaker to obtain the virtual bass output signal includes: the electronic device performs frequency division processing on the output signal to obtain a first low-frequency output signal and a first high-frequency output signal, where the first low-frequency output signal includes a signal whose frequency is lower than a third preset frequency in the output signal, and the first high-frequency output signal includes a signal whose frequency is higher than the third preset frequency in the output signal; the electronic device generates a harmonic signal of the first low-frequency output signal based on the first low-frequency output signal; then the electronic device mixes the harmonic signal and the first low-frequency output signal to obtain a first mixed signal; the electronic device performs phase synchronization processing on the first mixed signal and the first high-frequency output signal to obtain a second mixed signal and a second high-frequency output signal, where a phase variation of the second mixed signal is equal to a phase variation of the second high-frequency output signal; and then the electronic device obtains the virtual bass output signal based on the second mixed signal and the second high-frequency output signal.

In an embodiment, the method for improving sound quality of a speaker according to this embodiment of this application further includes: the electronic device adjusts, based on a coil temperature of the speaker, a nonlinear parameter of a first nonlinear compensation model preconfigured in the speaker, to obtain a second nonlinear compensation model; and then the electronic device performs signal compensation on the output signal by using the second nonlinear compensation model.

In this embodiment of this application, because a determined second nonlinear parameter of the speaker is a nonlinear parameter corresponding to a current working state of the speaker, that is, a real-time nonlinear parameter, accuracy of the determined second nonlinear parameter is high. Therefore, signal compensation is performed on the output signal of the speaker based on the second nonlinear parameter, and a signal compensation effect is good. This can effectively reduce signal distortion and improve sound quality of the speaker.

According to a second aspect, an embodiment of this application provides an electronic device. The electronic device includes a first obtaining module, a first determining module, an envelope modulation module, and a second determining module. The first obtaining module is configured to perform frequency division on an input signal of a speaker to obtain a first low-frequency input signal and a first high-frequency input signal, where the input signal of the speaker is a time domain signal, the first low-frequency input signal includes a signal whose frequency is lower than a first preset frequency in the input signal, and the first high-frequency input signal includes a signal whose frequency is higher than the first preset frequency in the input signal; the first determining module is configured to perform transient detection on the first low-frequency input signal to determine whether the first low-frequency input signal is a transient signal; if the first low-frequency input signal is a transient signal, the envelope modulation module is configured to perform signal envelope modulation on the first low-frequency input signal to obtain a second low-frequency input signal, where a startup voltage of the second low-frequency input signal is higher than a startup voltage of the first low-frequency input signal, and loudness of the second low-frequency input signal is greater than loudness of the first low-frequency input signal; and the second determining module is configured to determine an output signal of the speaker based on the second low-frequency input signal and the first high-frequency input signal.

In an embodiment, the first obtaining module is further configured to perform frequency division on the first high-frequency input signal of the speaker to obtain a first intermediate-frequency input signal and a second high-frequency input signal, where the first intermediate-frequency input signal includes a signal whose frequency is lower than a second preset frequency in the first high-frequency input signal, the second high-frequency input signal includes a signal whose frequency is higher than the second preset frequency in the first high-frequency input signal, and the second preset frequency is higher than the first preset frequency; the first determining module is further configured to perform transient detection on the first intermediate-frequency input signal to determine whether the first intermediate-frequency input signal is a transient signal; if the first intermediate-frequency input signal is a transient signal, the envelope modulation module is further configured to perform signal envelope modulation on the first intermediate-frequency input signal to obtain a second intermediate-frequency input signal, where a startup voltage of the second intermediate-frequency input signal is higher than a startup voltage of the first intermediate-frequency input signal, and loudness of the second intermediate-frequency input signal is greater than loudness of the first intermediate-frequency input signal; and the second determining module is configured to obtain the output signal of the speaker based on the second low-frequency input signal, the second intermediate-frequency input signal, and the second high-frequency input signal.

In an embodiment, the electronic device provided in this embodiment of this application further includes a generation module and a second obtaining module. The generation module is configured to generate a low-frequency auxiliary signal; the second obtaining module is configured to add the low-frequency auxiliary signal to the first low-frequency input signal to obtain a first auxiliary enhanced signal; and the envelope modulation module is configured to perform signal envelope modulation on the first auxiliary enhanced signal to obtain the second low-frequency input signal.

In an embodiment, the generation module is configured to generate a first auxiliary signal, and perform high-pass filtering on the first auxiliary signal to obtain the low-frequency auxiliary signal, where the first auxiliary signal meets: $signal\_h = e^{-A} \times \sin(2\pi f)$, where signal_h represents the low-frequency auxiliary signal, A represents a signal amplitude influencing factor, and f is a center frequency of the speaker.

In an embodiment, the electronic device provided in this embodiment of this application further includes a phase compensation module, where the phase compensation module is configured to perform phase compensation on the first low-frequency input signal to obtain a first phase-compensated signal; and the envelope modulation module is configured to perform signal envelope modulation on the first phase-compensated signal to obtain the second low-frequency input signal.

In an embodiment, the first determining module is configured to: determine transient power and steady-state power of the first low-frequency input signal; determine an instantaneous rate of the first low-frequency input signal based on the transient power and the steady-state power of the first low-frequency input signal; and if a transient rate of the first low-frequency input signal is greater than a preset transient rate threshold, determine that the first low-frequency input signal is a transient signal, where the instantaneous rate of the first low-frequency input signal meets: $T_r = (R_r - 1)^2 \times W$, where $T_r$ represents the instantaneous rate of the first low-frequency input signal, $R_r$ represents a ratio of the transient power of the first low-frequency input signal to the steady-state power of the first low-frequency input signal, W represents a weighting factor, and a value of W is the same as current power of the first low-frequency input signal.

In an embodiment, the electronic device provided in this embodiment of this application further includes an equalization processing module and a bass enhancement module, where the equalization processing module is configured to perform equalization processing on a first signal to obtain a second signal, where the first signal is an initial to-be-played signal that is input to the speaker; and the bass enhancement module is configured to process the second signal by using a bass enhancement algorithm, to obtain the input signal of the speaker.

In an embodiment, the bass enhancement module is configured to: determine a gain of a low-frequency shelving filter based on energy of a low-frequency signal in the second signal, where the low-frequency shelving filter is configured to control loudness of the low-frequency signal in the second signal; and filter the second signal by using the low-frequency shelving filter, to obtain the input signal of the speaker.

In an embodiment, the electronic device provided in this embodiment of this application further includes a third obtaining module, a first adjustment module, and a control module, where the third obtaining module is configured to obtain a first displacement prediction model including one or more correction coefficients, where the first displacement prediction model is used to simulate performance of the speaker to predict a displacement of a diaphragm of the speaker, and the one or more correction coefficients are used to control an output of the first displacement prediction model; the first adjustment module is configured to adjust at least one correction coefficient in the first displacement prediction model to obtain a second displacement prediction model, where an absolute value of a difference between a predicted displacement output by the second displacement prediction model and an actual displacement of the diaphragm of the speaker is less than an absolute value of a difference between a predicted displacement output by the first displacement prediction model and the actual displacement of the diaphragm of the speaker, and the actual displacement is an actual measured value of a movement distance of the diaphragm relative to an initial location; and the control module is configured to control a gain of the output signal of the speaker based on a displacement protection threshold of the speaker and the predicted displacement output by the second displacement prediction model, so that a displacement of the diaphragm when the speaker plays the output signal is less than or equal to the displacement protection threshold, where the displacement protection threshold is a maximum displacement of the diaphragm of the speaker.

In an embodiment, the electronic device provided in this embodiment of this application further includes a virtual bass processing module, where the virtual bass processing module is configured to perform virtual bass processing on the output signal to obtain a virtual bass output signal, where psychologically perceived low-frequency loudness of the virtual bass output signal is greater than psychologically perceived low-frequency loudness of the output signal.

In an embodiment, the virtual bass processing module is configured to: perform frequency division processing on the output signal to obtain a first low-frequency output signal and a first high-frequency output signal, where the first low-frequency output signal includes a signal whose frequency is lower than a third preset frequency in the output signal, and the first high-frequency output signal includes a signal whose frequency is higher than the third preset frequency in the output signal; generate a harmonic signal of the first low-frequency output signal based on the first low-frequency output signal; mix the harmonic signal and the first low-frequency output signal to obtain a first mixed signal; perform phase synchronization processing on the first mixed signal and the first high-frequency output signal to obtain a second mixed signal and a second high-frequency output signal, where a phase variation of the second mixed signal is equal to a phase variation of the second high-frequency output signal; and then obtain the virtual bass output signal based on the second mixed signal and the second high-frequency output signal.

In an embodiment, the electronic device provided in this embodiment of this application further includes a second adjustment module and a signal compensation module, where the second adjustment module is configured to adjust, based on a coil temperature of the speaker, a nonlinear parameter of a first nonlinear compensation model preconfigured in the speaker, to obtain a second nonlinear compensation model; and the signal compensation module is configured to perform signal compensation on the output signal of the speaker by using the second nonlinear compensation model.

According to a third aspect, an embodiment of this application provides an electronic device. The electronic device includes a memory and at least one processor connected to the memory. The memory is configured to store instructions. After the instructions stored in the memory are read by the at least one processor, the method according to any one of the first aspect and the embodiments of the first aspect is performed.

According to a fourth aspect, an embodiment of this application provides a computer-readable storage medium. The computer-readable storage medium stores a computer program. When the computer program is executed by a processor, the method according to any one of the first aspect and the embodiments of the first aspect is performed.

According to a fifth aspect, an embodiment of this application provides a computer program product including instructions. When the computer program product is run on a computer, the computer is enabled to perform the method according to any one of the first aspect and the embodiments of the first aspect.

According to a sixth aspect, an embodiment of this application provides a chip, including a memory and a processor. The memory is configured to store computer instructions. The processor is configured to invoke the computer instructions from the memory and run the computer instructions, to perform the method according to any one of the first aspect and the embodiments of the first aspect.

It should be understood that for beneficial effects achieved by technical solutions in the second aspect to the sixth aspect and the corresponding embodiments in embodiments of this application, refer to the foregoing technical effects in the first aspect and the corresponding embodiments of the first aspect. Details are not described herein again.

DESCRIPTION OF EMBODIMENTS

Figure 1:
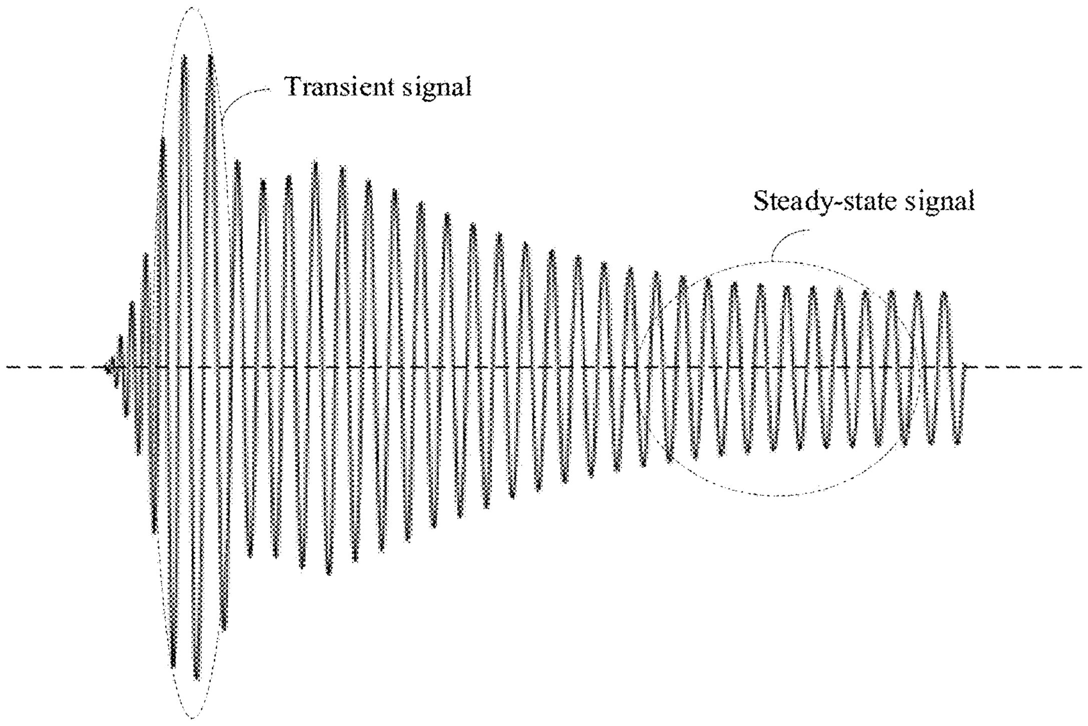
FIG. 1 is a schematic diagram of a transient signal and a steady-state signal according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects, but do not describe a specific order of the objects. For example, a first low-frequency input signal and a second low-frequency input signal are intended to distinguish between different input signals, but do not describe a specific order of the low-frequency input signals. For another example, a first high-frequency input signal and a second high-frequency input signal are intended to distinguish between different high-frequency input signals, but do not describe a specific order of the high-frequency input signals. For another example, a first intermediate-frequency input signal and a second intermediate-frequency input signal are intended to distinguish between different intermediate-frequency input signals, but do not describe a specific order of the intermediate-frequency input signals.

In the embodiments of this application, the term "example" or "for example" is used to represent an example, an illustration, or a description. Any embodiment or design scheme described as an "example" or "for example" in the embodiments of this application should not be construed as being more preferred or having more advantages than another embodiment or design scheme. Exactly, use of the term "example" or "for example" or the like is intended to present a relative concept in a specific manner.

In the descriptions of the embodiments of this application, unless otherwise stated, "a plurality of" means two or more. For example, a plurality of correction coefficients are two or more correction coefficients.

First, some concepts related to a method and an apparatus for improving sound quality of a speaker according to the embodiments of this application are explained and described.

Loudness: Loudness is used to measure sound intensity subjectively perceived by a human being. Generally, when a frequency of sound is fixed, higher sound intensity indicates higher loudness. However, the loudness is related to the frequency. If the sound intensity is the same, but the frequency is different, the loudness may also be different. The loudness may be a sound pressure level of an audio signal. Simply, the loudness may also be understood as volume of the audio signal.

It should be understood that an objective of the technical solutions provided in the embodiments of this application is to improve loudness of a low-frequency signal in an audio signal to be played by the speaker, so as to improve sound quality of the speaker.

Low-frequency dynamic change: It is a process in which a signal changes from small to large and then to small. A slight dynamic change of a low-frequency signal in an audio signal affects auditory perception of a user. A good low-frequency dynamic change refers to fast startup of a low-frequency vibration, large peak loudness, and a high decay speed. If a low-frequency dynamic is better, when an audio signal is played, a low-frequency detail part in the audio signal can be presented, so that the user has good subjective auditory perception.

Input signal of the speaker: It may also be referred to as an input voltage signal. In the embodiments of this application, audio signals are processed frame by frame. Therefore, in a process of processing signal frames, an input signal of the speaker is a signal frame.

The input signal of the speaker includes M (M is an integer greater than or equal to 1) digital signals, and corresponds to n voltage values (which may also be referred to as n points). For example, Input signal $U_{in}=[U_{in}(1), U_{in}(2), \ldots, U_{in}(n), \ldots, U_{in}(M)]$. In the embodiments of this application, processing the input signal means sequentially processing all digital signals in the input signal. For ease of description, a time point at which an $n^{th}$ digital signal is input is denoted as $t_n$, and an input signal corresponding to the time point $t_n$ is denoted as $U_{in}(t_n)$ or $(t_n)$.

The loudness and the dynamic change may be used to measure sound quality of the audio signal played by the speaker. Especially for a micro speaker, the low-frequency loudness and dynamic change are main objectives of audio signal processing.

Transient signal and steady-state signal: A signal that lasts for a short time and has an obvious start and end is referred to as a transient signal. A signal that keeps changing within a small range in a long time period is referred to as a steady-state signal. For example, FIG. 1 shows a transient signal and a steady-state signal in a segment of audio signals.

A displacement of the speaker refers to a movement distance of a diaphragm of the speaker during working.

The displacement of the speaker affects sound quality of the speaker. When the displacement of the diaphragm of the speaker is excessively large, the diaphragm of the speaker may hit a top plate or wipe the coil, causing noise or even mechanical damage to the speaker. In the embodiments of this application, the displacement of the speaker may be controlled, so that sound quality of the speaker is improved.

Nonlinear parameters of the speaker: The nonlinear parameters of the speaker may include but are not limited to the following parameters:

Force factor BL (x): It refers to a force factor of a magnetic circuit system of the speaker.

Mechanical stiffness Kms (x): It refers to stiffness of a suspension system of the speaker, and Kms (x) may include different coefficients such as a first-order coefficient, a second-order coefficient, and a third-order coefficient.

Inductance Le (x): It refers to inductance of a coil of the speaker.

Damping Rm (v): It is a damping factor of the speaker, and Rm (v) may include different coefficients such as a first-order coefficient, a second-order coefficient, and a third-order coefficient.

In the foregoing parameters, x is the displacement of the diaphragm of the speaker, and v is a moving speed of the diaphragm of the speaker.

It should be noted that the nonlinear parameters of the speaker may change when the speaker works in different states. For example, when the coil of the speaker is at different temperatures, Kms (x) may change, and Rm (v) may also change. In other words, Kms (x) varies at different temperatures, and Rm (v) varies at different temperatures.

Nonlinearity of the speaker: The nonlinearity of the speaker is a phenomenon of distortion of output sound of the speaker due to a hardware structure of the speaker (for example, a structural feature such as a small size and a large displacement of the speaker), and may be referred to as nonlinear distortion. Especially when a large signal is input into the speaker, the nonlinearity of the speaker is more obvious, an output signal may be excessively distorted, and consequently, auditory perception is affected.

In the embodiments of this application, the nonlinear parameters of the speaker may be used to compensate for nonlinear distortion caused by hardware of the speaker, to improve sound quality of the speaker.

Currently, loudness of audio signals played by most speakers is insufficient, and dynamic change performance is poor. Therefore, when the speakers play the audio signals, sound quality is poor. For a user, low- and medium-frequency signals in audio signals play an important role in auditory perception, and directly affect the auditory perception of the user. Therefore, how to improve low-frequency sound effect of a micro speaker is a problem that needs to be urgently resolved. Some existing methods for improving sound quality of a speaker involve processing an audio signal from a perspective of displacement protection, nonlinear compensation of the speaker, or the like, to maximally exploit hardware potentials of the speaker and improve loudness of the speaker. However, effects of these methods on improving sound quality of the speaker still need to be improved.

The embodiments of this application provide a method and an apparatus for improving sound quality of a speaker. The method and apparatus may be applied to an electronic device having a speaker. The electronic device processes a to-be-reproduced audio signal (referred to as an input signal of the speaker in the following embodiments) to improve sound quality of the speaker. In an embodiment, the electronic device performs frequency division on the input signal of the speaker to obtain a first low-frequency input signal and a first high-frequency input signal; then the electronic device performs transient detection on the first low-frequency input signal of the speaker to determine whether the first low-frequency input signal is a transient signal, and if the first low-frequency input signal is a transient signal, performs signal envelope modulation on the first low-frequency input signal to obtain a second low-frequency input signal, where a startup voltage of the second low-frequency input signal is higher than a startup voltage of the first low-frequency input signal, and loudness of the second low-frequency input signal is greater than loudness of the first low-frequency input signal; and finally the electronic device determines an output signal of the speaker based on the second low-frequency input signal and the first high-frequency input signal. According to the technical solutions provided in the embodiments of this application, low-frequency sound effect of the speaker can be improved, and sound quality of the speaker can be improved.

The method for improving sound quality of a speaker according to the embodiments of this application may be applied to an electronic device having an audio playing function in speaker mode (that is, having a speaker), for example, an electronic device equipped with a speaker, such as a mobile phone, a tablet computer, a notebook computer, a smart speaker, or a television.

In all scenarios in which a speaker of an electronic device is used to produce a sound, the method provided in the embodiments of this application may be used. For example, the method for improving sound quality of a speaker according to the embodiments of this application may be applied to the following scenarios: music and movie playing in speaker mode (including mono playing, dual-channel playing, and four-channel playing), hands-free calls (including conventional telephone calls, VoIP calls, and the like), mobile phone ringtones (including a speaker mode and a headset mode), game playing in speaker mode, and the like, to maximally exploit hardware potentials of the speaker, improve low-frequency sound effect of the speaker, and improve sound quality of the speaker, so that subjective experience of a user can be improved.

Figure 2:
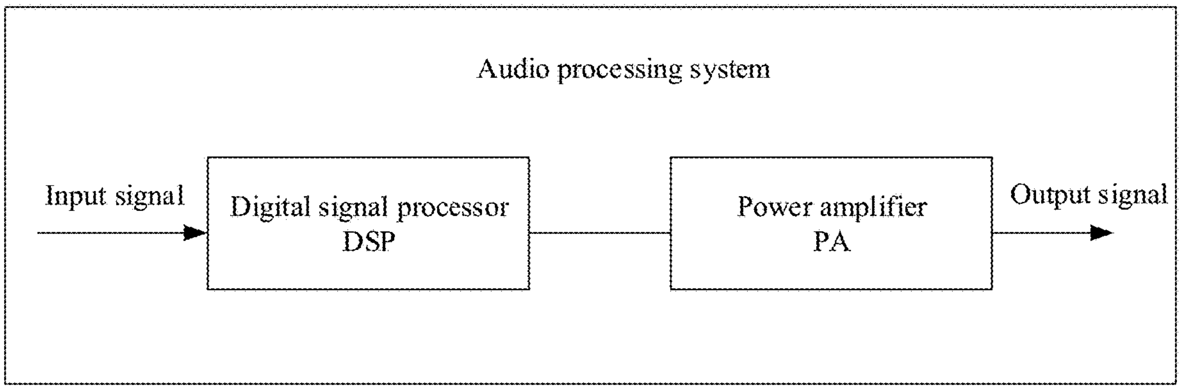
FIG. 2 is a block diagram of an audio processing system according to an embodiment of this application.

It should be understood that the method for improving sound quality of a speaker according to the embodiments of this application is mainly completed by an audio processing system in the electronic device. Referring to FIG. 2, the audio processing system mainly includes a digital signal processor (DSP) and a power amplifier (PA). The DSP is configured to process an input audio signal. The processed signal is amplified by the PA, and finally output to the speaker for playing.

Figure 3:
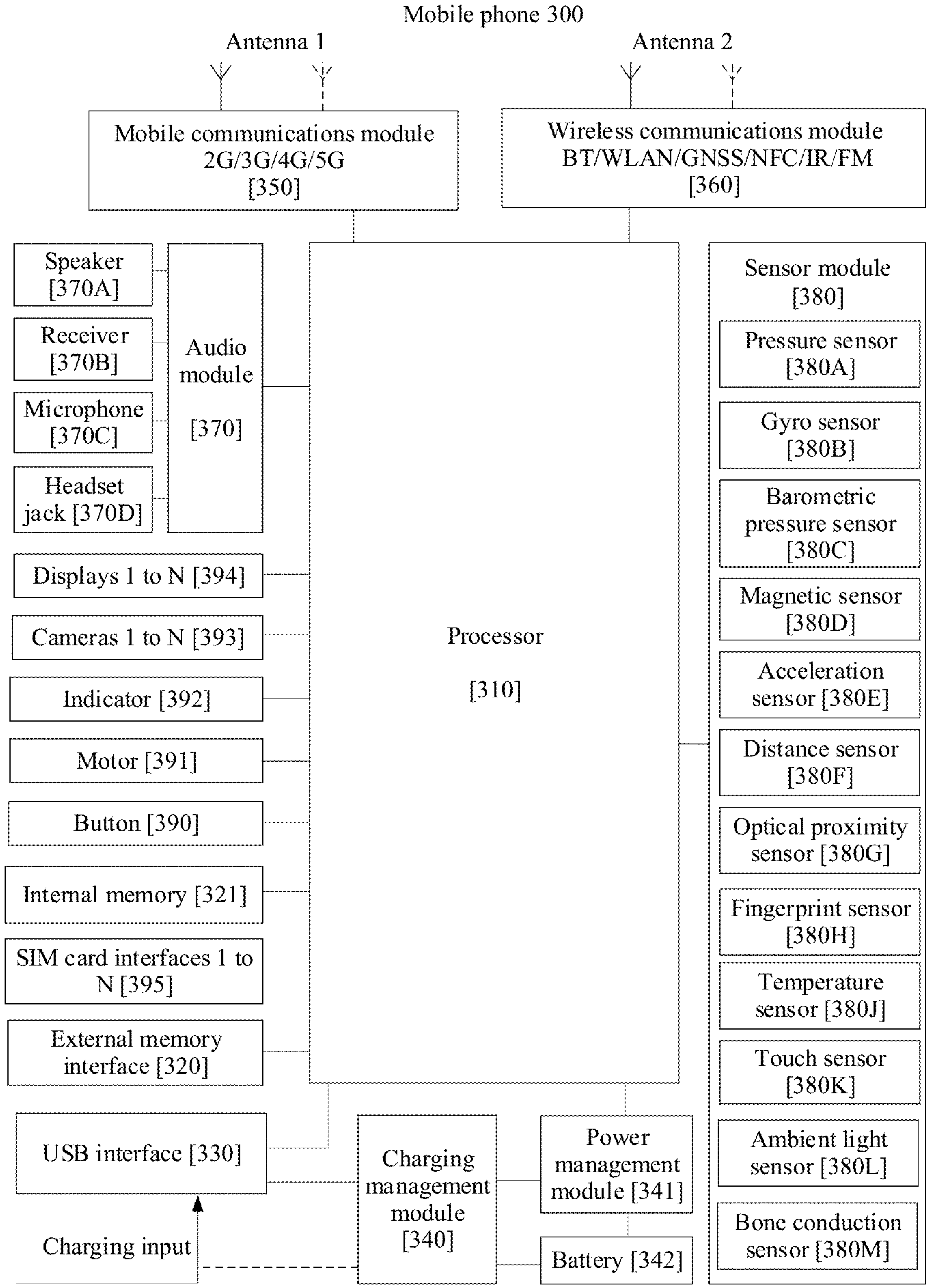
FIG. 3 is a schematic diagram of a hardware structure of a mobile phone according to an embodiment of this application.

Assuming that the electronic device is a mobile phone, the following describes in detail a detailed structure of a mobile phone to which a method for improving sound quality of a speaker according to an embodiment of this application may be applied. FIG. 3 is a schematic diagram of a structure of a mobile phone 300. The mobile phone 300 may include a processor 310, an external memory interface 320, an internal memory 321, a universal serial bus (USB) interface 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a subscriber identity module (SIM) card interface 395, and the like. The sensor module 380 may include a pressure sensor 380A, a gyro sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment of this application does not constitute a specific limitation on the mobile phone 300. In some other embodiments of this application, the mobile phone 300 may include more or fewer components than those shown in the figure, or some components are combined, or some components are split, or component arrangements are different. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone 300. The controller may generate an operation control signal based on instruction operation code and a time sequence signal, to control instruction fetching and instruction execution.

A memory may be further disposed in the processor 310, and is configured to store instructions and data. In some embodiments, the memory in the processor 310 is a cache.

The memory may store an instruction or data just used or cyclically used by the processor 310. If the processor 310 needs to use the instruction or the data again, the processor 310 may directly invoke the instruction or the data from the memory. This avoids repeated access, reduces waiting time of the processor 310, and improves system efficiency.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, including one serial data line (SDA) and one serial clock line (SCL). In some embodiments, the processor 310 may include a plurality of groups of I2C buses. The processor 310 may be coupled to the touch sensor 380K, a charger, a flash, the camera 393, and the like through different I2C bus interfaces. For example, the processor 310 may be coupled to the touch sensor 380K through the I2C interface, so that the processor 310 communicates with the touch sensor 380K through the I2C bus interface to implement a touch function of the mobile phone 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communications module 360 through the I2S interface, to implement a function of answering a call by using a Bluetooth headset.

The PCM interface may also be configured to perform audio communication, and sample, quantize, and code an analog signal. In some embodiments, the audio module 370 may be coupled to the wireless communications module 360 through the PCM bus interface. In some embodiments, the audio module 370 may alternatively transmit an audio signal to the wireless communications module 360 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 310 to the wireless communications module 360. For example, the processor 310 communicates with a Bluetooth module in the wireless communications module 360 through the UART interface, to implement a Bluetooth function. In some embodiments, the audio module 370 may transmit an audio signal to the wireless communications module 360 through the UART interface, to implement a function of playing music by using a Bluetooth headset.

The MIPI interface may be configured to connect the processor 310 to a peripheral component such as the display 394 or the camera 393. The MIPI interface includes a camera serial interface (CSI), a display serial interface (DSI), and the like. In some embodiments, the processor 310 communicates with the camera 393 through the CSI interface, to implement a photographing function of the mobile phone 300. The processor 310 communicates with the display 394 through the DSI interface, to implement a display function of the mobile phone 300.

The GPIO interface may be configured by software. The GPIO interface may be configured as a control signal or a data signal. In some embodiments, the GPIO interface may be configured to connect the processor 310 to the camera 393, the display 394, the wireless communications module 360, the audio module 370, the sensor module 380, and the like. The GPIO interface may alternatively be configured as an I2C interface, an I2S interface, a UART interface, an MIPI interface, or the like.

The USB interface 330 is an interface complying with a USB standard specification, and may be a mini USB interface, a micro USB interface, a USB type-C interface, or the like. The USB interface 330 may be configured to connect to a charger to charge the mobile phone 300, or may be configured to transmit data between the mobile phone 300 and a peripheral device, or may be configured to connect to a headset for playing an audio through the headset. Alternatively, the interface may be configured to connect to another electronic device, for example, an AR device.

It may be understood that an interface connection relationship between the modules shown in this embodiment of this application is merely an example for description, and does not constitute a limitation on the structure of the mobile phone 300. In some other embodiments of this application, the mobile phone 300 may alternatively use an interface connection mode different from that in the foregoing embodiment, or use a combination of a plurality of interface connection modes.

The charging management module 340 is configured to receive a charging input from a charger. The charger may be a wireless charger, or may be a wired charger. In some embodiments of wired charging, the charging management module 340 may receive a charging input from the wired charger through the USB interface 330. In some embodiments of wireless charging, the charging management module 340 may receive a wireless charging input by using a wireless charging coil of the mobile phone 300. While charging the battery 342, the charging management module 340 may further supply power to the electronic device by using the power management module 341.

The power management module 341 is configured to connect the battery 342 and the charging management module 340 to the processor 310. The power management module 341 receives an input from the battery 342 and/or the charging management module 340, and supplies power to the processor 310, the internal memory 321, an external memory, the display 394, the camera 393, the wireless communications module 360, and the like. The power management module 341 may be further configured to monitor parameters such as a battery capacity, a battery cycle count, and a battery health status (e.g., electric leakage or impedance). In some other embodiments, the power management module 341 may alternatively be disposed in the processor 310. In some other embodiments, the power management module 341 and the charging management module 340 may alternatively be disposed in a same component.

A wireless communication function of the mobile phone 300 may be implemented by using the antenna 1, the antenna 2, the mobile communications module 350, the wireless communications module 360, the modem processor, the baseband processor, and the like.

The antenna 1 and the antenna 2 are configured to transmit and receive electromagnetic wave signals. Each antenna in the mobile phone 300 may be configured to cover one or more communication frequency bands. Different antennas may be further reused to improve antenna utilization. For example, the antenna 1 may be reused as a diversity antenna of a wireless local area network. In some other embodiments, the antenna may be used in combination with a tuning switch.

The mobile communications module 350 may provide a solution applied to the mobile phone 300 and incorporating wireless communication such as 2G/3G/4G/5G. The mobile communications module 350 may include at least one filter, a switch, a power amplifier, a low noise amplifier (LNA), and the like. The mobile communications module 350 may receive an electromagnetic wave by using the antenna 1, perform processing such as filtering or amplification on the received electromagnetic wave, and transmit the processed electromagnetic wave to the modem processor for demodulation. The mobile communications module 350 may further amplify a signal modulated by the modem processor, and convert the amplified signal into an electromagnetic wave for radiation by using the antenna 1. In some embodiments, at least some functional modules of the mobile communications module 350 may be disposed in the processor 310. In some embodiments, at least some functional modules of the mobile communications module 350 and at least some modules of the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 370A, the receiver 370B, or the like), or displays an image or a video by using the display 394. In some embodiments, the modem processor may be an independent component. In some other embodiments, the modem processor may be independent of the processor 310, and is disposed in a same component as the mobile communications module 350 or another functional module.

The wireless communications module 360 may provide a solution applied to the mobile phone 300 and incorporating wireless communication such as a wireless local area network (WLAN) (for example, a Wireless Fidelity (Wi-Fi) network), Bluetooth (BT), a global navigation satellite system (GNSS), frequency modulation (FM), a near field communication (NFC) technology, and an infrared (IR) technology. The wireless communications module 360 may be one or more components integrating at least one communication processing module. The wireless communications module 360 receives an electromagnetic wave by using the antenna 2, performs frequency modulation and filtering processing on an electromagnetic wave signal, and sends the processed signal to the processor 310. The wireless communications module 360 may further receive a to-be-sent signal from the processor 310, perform frequency modulation and amplification on the signal, and convert the signal into an electromagnetic wave for radiation by using the antenna 2.

In some embodiments, the antenna 1 of the mobile phone 300 is coupled to the mobile communications module 350, and the antenna 2 is coupled to the wireless communications module 360, so that the mobile phone 300 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, the GNSS, the WLAN, NFC, FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 300 implements the display function by using the GPU, the display 394, the application processor, and the like. The GPU is a microprocessor for image processing, and is connected to the display 394 and the application processor. The GPU is configured to perform mathematical and geometric computation, and render an image. The processor 310 may include one or more GPUs, and the GPUs execute program instructions to generate or change display information.

The display 394 is configured to display an image, a video, and the like. The display 394 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the mobile phone 300 may include one or N displays 394, where N is a positive integer greater than 1.

The mobile phone 300 may implement the photographing function by using the ISP, the camera 393, the video codec, the GPU, the display 394, the application processor, and the like.

The ISP is configured to process data fed back by the camera 393. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 393.

The camera 393 is configured to capture a still image or a video. An optical image of an object is generated through the lens and projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile phone 300 may include one or N cameras 393, where N is a positive integer greater than 1.

The digital signal processor is configured to process a digital signal, and may further process another digital signal (such as an audio signal) in addition to a digital image signal. For example, when the mobile phone 300 selects a frequency, the digital signal processor is configured to perform Fourier transform on frequency energy, and the like.

The video codec is configured to compress or decompress a digital video. The mobile phone 300 may support one or more video codecs. In this way, the mobile phone 300 can play or record videos in a plurality of coding formats, for example, moving picture experts group (moving picture experts group, MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the mobile phone 300, such as image recognition, facial recognition, speech recognition, and text understanding, can be implemented by using the NPU.

The external memory interface 320 may be configured to connect to an external storage card such as a micro SD card, to extend a storage capacity of the mobile phone 300. The external storage card communicates with the processor 310 through the external memory interface 320, to implement a data storage function. For example, files such as music and videos are stored in the external storage card.

The internal memory 321 may be configured to store computer-executable program code, and the executable program code includes instructions. The processor 310 executes various functional applications and data processing of the mobile phone 300 by running instructions stored in the internal memory 321. The internal memory 321 may include a program storage area and a data storage area. The program storage area may store an operating system, an application required by at least one function (for example, a voice play function and an image play function), and the like. The data storage area may store data (such as audio data and an address book) created during use of the mobile phone 300, and the like. In addition, the internal memory 321 may include a high-speed random access memory, and may further include a nonvolatile memory, for example, at least one magnetic disk storage device, a flash memory, or a universal flash storage (UFS).

The mobile phone 300 may implement an audio function such as music playing or recording through the audio module 370, the speaker 370A, the receiver 370B, the microphone 370C, the headset jack 370D, the application processor, and the like.

The audio module 370 is configured to convert digital audio information into an analog audio signal for outputting, and is also configured to convert an analog audio input into a digital audio signal. The audio module 370 may be further configured to code and decode audio signals. In some embodiments, the audio module 370 may be disposed in the processor 310, or some functional modules in the audio module 370 are disposed in the processor 310.

The speaker 370A, also referred to as a "loudspeaker", is configured to convert an audio electrical signal into a sound signal. The mobile phone 300 may be configured to listen to music or answer a hands-free call by using the speaker 370A.

The receiver 370B, also referred to as an "earpiece", is configured to convert an audio electrical signal into a sound signal. When a call is answered or voice information is received by using the mobile phone 300, the receiver 370B may be put close to a human ear to listen to a voice.

The microphone 370C, also referred to as a "mike" or a "microphone", is configured to convert a sound signal into an electrical signal. When making a call or sending voice information, a user may make a sound near the microphone 370C by using the mouth of the user, to enter a sound signal to the microphone 370C. At least one microphone 370C may be disposed in the mobile phone 300. In some other embodiments, two microphones 370C may be disposed in the mobile phone 300, to capture sound signals and further implement a noise reduction function. In some other embodiments, three, four, or more microphones 370C may alternatively be disposed in the mobile phone 300, to capture sound signals, reduce noise, and further recognize a sound source, to implement a directional recording function or the like.

The headset jack 370D is configured to connect to a wired headset. The headset jack 370D may be the USB interface 330, or may be a 3.5 mm open mobile terminal platform (OMTP) standard interface or a cellular telecommunications industry association of the USA (CTIA) standard interface.

The pressure sensor 380A is configured to sense a pressure signal, and can convert the pressure signal into an electrical signal. In some embodiments, the pressure sensor 380A may be disposed on the display 394. There are a plurality of types of pressure sensors 380A, for example, a resistive pressure sensor, an inductive pressure sensor, and a capacitive pressure sensor. The capacitive pressure sensor may include at least two parallel plates made of conductive materials. When force is applied to the pressure sensor 380A, capacitance between electrodes changes. The mobile phone 300 determines pressure strength based on a capacitance change. When a touch operation is performed on the display 394, the mobile phone 300 detects strength of the touch operation based on the pressure sensor 380A. The mobile phone 300 may also calculate a touch position based on a detection signal of the pressure sensor 380A. In some embodiments, touch operations that are performed in a same touch position but have different touch operation strength may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on the SMS message application icon, an instruction for creating an SMS message is executed.

The gyro sensor 380B may be configured to determine a motion posture of the mobile phone 300. In some embodiments, the gyro sensor 380B may be used to determine angular velocities of the mobile phone 300 around three axes (that is, an x-axis, a y-axis, and a z-axis). The gyro sensor 380B may be configured to implement image stabilization during photographing. For example, when the shutter is pressed, the gyro sensor 380B detects an angle at which the mobile phone 300 jitters, calculates, based on the angle, a distance for which a lens module needs to compensate, and allows the lens to cancel the jitter of the mobile phone 300 through reverse motion, to implement image stabilization. The gyro sensor 380B may also be used in a navigation scenario and a motion-sensing game scenario.

The barometric pressure sensor 380C is configured to measure barometric pressure. In some embodiments, the mobile phone 300 calculates an altitude based on a barometric pressure value measured by the barometric pressure sensor 380C, to assist in positioning and navigation.

The magnetic sensor 380D includes a Hall effect sensor. The mobile phone 300 may detect opening and closing of a flip cover or leather case by using the magnetic sensor 380D. In some embodiments, when the mobile phone 300 is a flip phone, the mobile phone 300 may detect opening and closing of the flip cover by using the magnetic sensor 380D. Further, a feature such as automatic unlocking of the flip cover is set based on a detected opening or closing state of the leather case or a detected opening or closing state of the flip cover.

The acceleration sensor 380E may detect values of acceleration in various directions (usually on three axes) of the mobile phone 300. When the mobile phone 300 is stationary, a value and a direction of gravity may be detected. The acceleration sensor 380E may be further configured to recognize a posture of the electronic device, and is used in an application such as switching between a landscape mode and a portrait mode or a pedometer.

The distance sensor 380F is configured to measure a distance. The mobile phone 300 may measure a distance in an infrared or a laser manner. In some embodiments, in a photographing scenario, the mobile phone 300 may measure a distance by using the distance sensor 380F, to implement quick focusing.

The optical proximity sensor 380G may include, for example, a light-emitting diode (LED) and an optical detector, for example, a photodiode. The light-emitting diode may be an infrared light-emitting diode. The mobile phone 300 emits infrared light by using the light-emitting diode. The mobile phone 300 detects infrared reflected light from a nearby object by using the photodiode. When sufficient reflected light is detected, the mobile phone 300 may determine that there is an object near the mobile phone 300. When insufficient reflected light is detected, the mobile phone 300 may determine that there is no object near the mobile phone 300. The mobile phone 300 may detect, by using the optical proximity sensor 380G, that the user holds the mobile phone 300 close to an ear for a call, to automatically turn off a screen for power saving. The optical proximity sensor 380G may also be used in smart cover mode or pocket mode to automatically perform screen unlocking or locking.

The ambient light sensor 380L is configured to sense ambient light brightness. The mobile phone 300 may adaptively adjust brightness of the display 394 based on the sensed ambient light brightness. The ambient light sensor 380L may also be configured to automatically adjust white balance during photographing. The ambient light sensor 380L may further cooperate with the optical proximity sensor 380G to detect whether the mobile phone 300 is in a pocket, to avoid an unintentional touch.

The fingerprint sensor 380H is configured to capture a fingerprint. The mobile phone 300 may use a feature of the captured fingerprint to implement fingerprint-based unlocking, application access locking, fingerprint-based photographing, fingerprint-based call answering, and the like.

The temperature sensor 380J is configured to detect a temperature. In some embodiments, the mobile phone 300 executes a temperature processing policy based on the temperature detected by the temperature sensor 380J. For example, when the temperature reported by the temperature sensor 380J exceeds a threshold, the mobile phone 300 lowers performance of a processor near the temperature sensor 380J, to reduce power consumption for thermal protection. In some other embodiments, when the temperature is less than another threshold, the mobile phone 300 heats the battery 342 to prevent the mobile phone 300 from being shut down abnormally due to a low temperature. In some other embodiments, when the temperature is less than another threshold, the mobile phone 300 boosts an output voltage of the battery 342 to avoid abnormal shutdown caused by a low temperature.

The touch sensor 380K is also referred to as a "touch panel". The touch sensor 380K may be disposed on the display 394. The touch sensor 380K and the display 394 form a touchscreen, which is also referred to as a "touchscreen". The touch sensor 380K is configured to detect a touch operation on or near the touch sensor 380K. The touch sensor may transfer the detected touch operation to the application processor to determine a type of the touch event. The display 394 may provide a visual output related to the touch operation. In some other embodiments, the touch sensor 380K may alternatively be disposed on a surface of the mobile phone 300, at a location different from a location of the display 394.

The bone conduction sensor 380M may obtain a vibration signal. In some embodiments, the bone conduction sensor 380M may obtain a vibration signal of a vibration bone of a human vocal-cord part. The bone conduction sensor 380M may also be in contact with a human pulse, to receive a blood pressure beat signal. In some embodiments, the bone conduction sensor 380M may alternatively be disposed in the headset, and combined with the headset into a bone conduction headset. The audio module 370 may obtain a voice signal through parsing based on the vibration signal that is of the vibration bone of the vocal-cord part and that is obtained by the bone conduction sensor 380M, to implement a voice function. The application processor may parse heart rate information based on the blood pressure beat signal obtained by the bone conduction sensor 380M, to implement a heart rate detection function.

The button 390 includes a power button, a volume button, and the like. The button 390 may be a mechanical button, or may be a touch button. The mobile phone 300 may receive a key input, and generate a key signal input related to a user setting and function control of the mobile phone 300.

The motor 391 may generate a vibration prompt. The motor 391 may be configured to provide an incoming call vibration prompt and a touch vibration feedback. For example, touch operations performed on different applications (for example, photographing and audio playing) may correspond to different vibration feedback effects. The motor 391 may also have different vibration feedback effects corresponding to touch operations performed on different areas of the display 394. Different application scenarios (for example, a time reminder, information receiving, an alarm clock, and a game) may also correspond to different vibration feedback effects. A touch vibration feedback effect may be further customized.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or removed from the SIM card interface 395, to implement contact with or separation from the mobile phone 300. The mobile phone 300 may support one or N SIM card interfaces, where N is a positive integer greater than 1. The SIM card interface 395 may support a nano SIM card, a micro SIM card, a SIM card, and the like. A plurality of cards may be simultaneously inserted into a same SIM card interface 395. The plurality of cards may be of a same type or different types. The SIM card interface 395 may be compatible with different types of SIM cards. The SIM card interface 395 may also be compatible with an external storage card. The mobile phone 300 interacts with the network by using the SIM card, to implement functions such as calling and data communication. In some embodiments, the mobile phone 300 uses an eSIM, that is, an embedded SIM card. The eSIM card may be embedded in the mobile phone 300, and cannot be separated from the mobile phone 300.

It may be understood that FIG. 3 merely uses the mobile phone as an example for description, and does not limit a structure of the electronic device. In an actual application, the electronic device may include more components than those shown in FIG. 3, or may include fewer components than those shown in FIG. 3. This is not limited in this embodiment of this application.

It may be understood that, in this embodiment of this application, a processor of the electronic device (for example, the foregoing mobile phone), for example, a DSP, may perform some or all of operations in the embodiments of this application. The steps or operations are merely examples. In the embodiments of this application, other operations or variations of various operations may be further performed. In addition, the operations may be performed in different orders presented in the embodiments of this application, and not all operations in the embodiments of this application may be performed. The embodiments of this application may be implemented separately, or may be implemented in any combination. This is not limited in this application.

Figure 4:
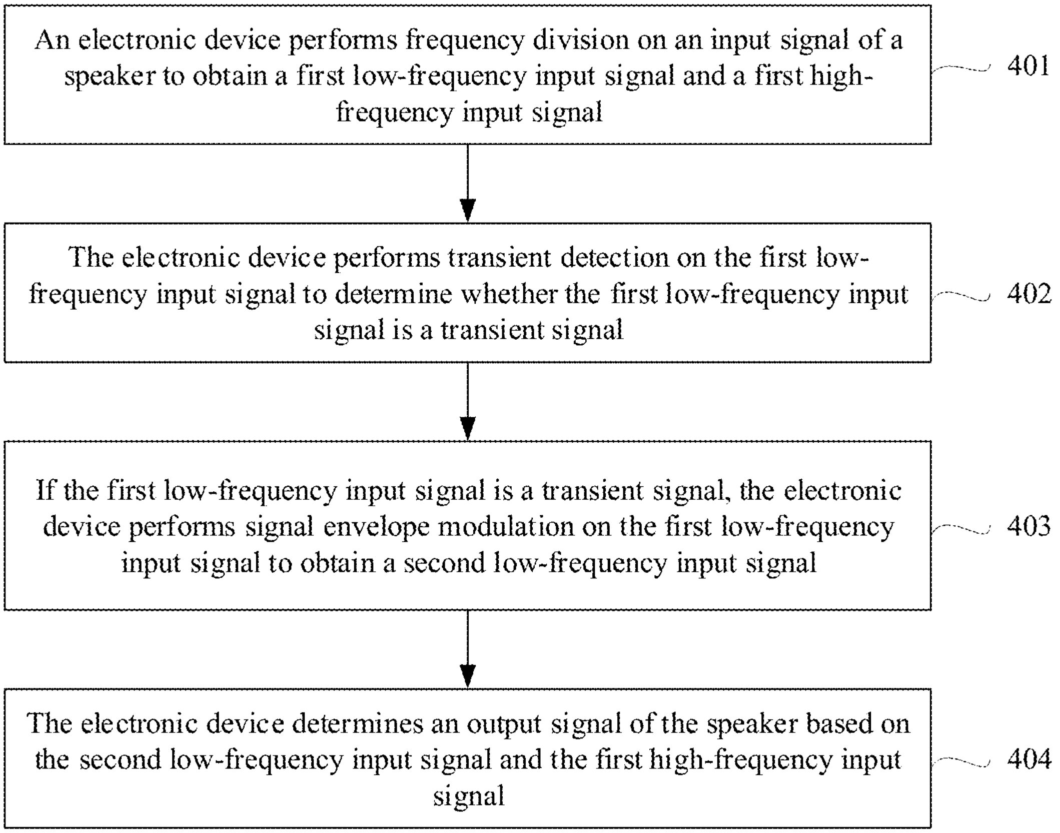
FIG. 4 is a schematic diagram of a method for improving sound quality of a speaker according to an embodiment of this application.

As shown in FIG. 4, an embodiment of this application provides a method for improving sound quality of a speaker. The method includes operation 401 to operation 404.

Operation 401: An electronic device performs frequency division on an input signal of the speaker to obtain a first low-frequency input signal and a first high-frequency input signal.

It should be understood that, in this embodiment of this application, the input signal of the speaker that is processed by the electronic device is a time domain signal. The first low-frequency input signal includes a signal whose frequency is lower than a first preset frequency in the input signal, and the first high-frequency input signal includes a signal whose frequency is higher than the first preset frequency in the input signal.

For example, the first preset frequency may be a frequency within a range of 100 Hz to 400 Hz. For example, the first preset frequency may be 100 Hz, 200 Hz, 250 Hz, 300 Hz, or 400 Hz.

It should be noted that a signal at the first preset frequency may be included in the first low-frequency input signal, or may be included in the first high-frequency input signal, or may be included in both the first low-frequency input signal and the first high-frequency input signal. This is not limited in this embodiment of this application.

In an embodiment, the electronic device may perform frequency division on input data by using a frequency divider. The frequency divider is essentially a filter for filtering the input signal, to obtain a low-frequency signal (referred to as the first low-frequency input signal) and a high-frequency signal (referred to as the first high-frequency input signal) in the input signal.

Operation 402: The electronic device performs transient detection on the first low-frequency input signal to determine whether the first low-frequency input signal is a transient signal.

In this embodiment of this application, it can be learned with reference to FIG. 1 that transient signals are some signals with relatively large signal amplitude variations. In an audio signal, a transient signal usually includes important information of an audio segment. Therefore, the transient signal in the audio signal may be processed to improve sound quality.

Figure 5:
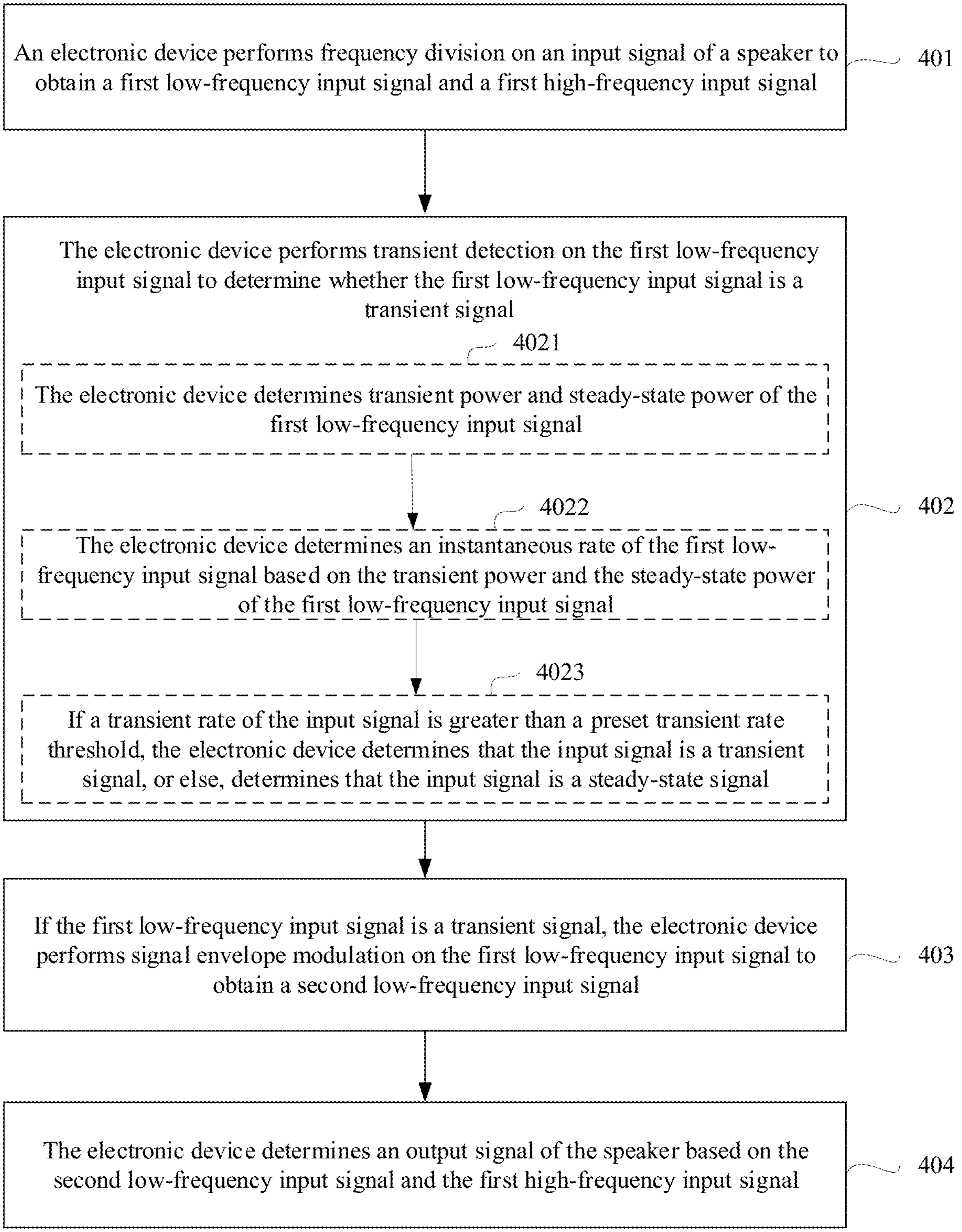
FIG. 5 is a schematic diagram of another method for improving sound quality of a speaker according to an embodiment of this application.

In an embodiment, with reference to FIG. 4, as shown in FIG. 5, in this embodiment of this application, a method for performing transient detection on the first low-frequency input signal by the electronic device includes operation 4021 to operation 4023.

Operation 4021: The electronic device determines transient power and steady-state power of the first low-frequency input signal.

In this embodiment of this application, a process in which the electronic device determines the transient power and the steady-state power of the first low-frequency input signal (corresponding to one signal frame) includes the following operations.

First, the electronic device calculates power of the first low-frequency input signal. It should be understood that the power of the first low-frequency input signal is an average value obtained based on a quadratic sum of voltage values of all data points included in the first low-frequency input signal.

Second, the transient power and the steady-state power of the first low-frequency input signal are determined based on power of a current frame and power of a plurality of frames (the plurality of frames are some historical frames) buffered in the electronic device. The transient power of the first low-frequency input signal may be average power of n1 consecutive signal frames before the current frame, and the steady-state power of the first low-frequency input signal may be average power of n2 consecutive signal frames before the current frame, where n1 is far less than n2, for example, a value of n1 is 5, and a value of n2 is 50.

Operation 4022: The electronic device determines an instantaneous rate of the first low-frequency input signal based on the transient power and the steady-state power of the first low-frequency input signal.

In this embodiment of this application, the instantaneous rate of the first low-frequency input signal meets:

$$T_r=(R_r-1)^2\times W,$$

where $T_r$ represents the instantaneous rate of the first low-frequency input signal, $R_r$ represents a ratio of the transient power of the first low-frequency input signal to the steady-state power of the first low-frequency input signal, and W represents a weighting factor.

In an embodiment, $$R_r=\frac{P_s}{P_w},$$

where $P_s$ represents transient power of the current frame, and $P_w$ represents steady-state power of the current frame. A value of the weighting factor may be the same as current power of the first low-frequency input signal.

In some embodiments, to avoid false detection of small signals, some small signals may be masked. In an embodiment, a masking threshold is set, and when the power of the first low-frequency input signal is less than the masking threshold, the masking threshold is used as the power of the first low-frequency input signal. In other words, $P_d$=max($P_d$, $P_{th}$), where $P_d$ represents the power of the first low-frequency input signal, and $P_{th}$ represents the masking threshold. Similarly, the ratio of the transient power of the first low-frequency input signal to the steady-state power of the first low-frequency input signal may also be optimized as follows: $R_r$=max($R_r$,1).

Operation 4023: If a transient rate of the input signal is greater than a preset transient rate threshold, the electronic device determines that the input signal is a transient signal, or else, determines that the input signal is a steady-state signal.

In this embodiment of this application, if the first low-frequency input signal is a transient signal, the first low-frequency input signal is marked, and the following operation 403 is performed to process the first low-frequency input signal; or if the first low-frequency input signal is a steady-state signal, the first low-frequency input signal is not processed.

In an embodiment, after the electronic device obtains the first low-frequency input signal, the electronic device may perform low-pass filtering on the first low-frequency input signal, and then calculate transient power and steady-state power of the filtered first low-frequency input signal, to further determine whether the first low-frequency input signal is a transient signal or a steady-state signal. In this embodiment of this application, low-pass filtering is performed on the first low-frequency input signal to obtain a low-frequency input signal within a lower frequency range, and a high-frequency signal that may exist in the first low-frequency input signal may be further reduced through the low-pass filtering. On this basis, transient detection is performed on the filtered first low-frequency input signal, so that a false detection rate of transient detection can be reduced.

Operation 403: If the first low-frequency input signal is a transient signal, the electronic device performs signal envelope modulation on the first low-frequency input signal to obtain a second low-frequency input signal.

In this embodiment of this application, performing envelope modulation on the audio signal is adjusting a startup voltage, loudness, and a decay speed of the signal, so that sound quality of the audio signal after the envelope modulation is better than sound quality of the audio signal before the envelope modulation. It should be understood that the startup voltage is a voltage that can enable a diaphragm of the speaker to quickly start to vibrate, that is, the startup voltage determines a startup speed of the diaphragm. A startup voltage of the second low-frequency input signal obtained by performing envelope modulation on the first low-frequency input signal is higher than a startup voltage of the first low-frequency input signal, and loudness of the second low-frequency input signal is greater than loudness of the first low-frequency input signal.

Figure 6:
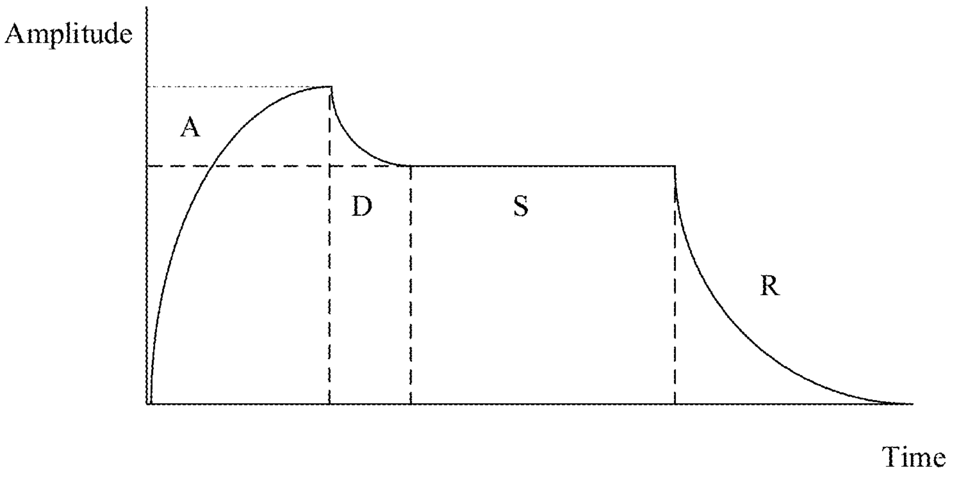
FIG. 6 is a schematic diagram of a principle of envelope modulation according to an embodiment of this application.

Referring to a schematic diagram of a principle of envelope modulation shown in FIG. 6, a transient signal waveform change usually includes four stages: an attack (attack, denoted as A) stage, a decay (decay, denoted as D) stage, a sustain (stain, denoted as S) stage, and a release (release, denoted as R) stage. Each stage has specific duration, and each stage has corresponding adjustment parameters. For example, adjustment parameters of the attack stage are a startup time and a startup voltage (target Ratio A), adjustment parameters of the decay stage are a decay time and a decay speed (target Radio DR), adjustment parameters of the sustain stage are duration and volume (that is, an amplitude and a sustain level), and adjustment parameters of the release stage are a release time and a release speed. In an embodiment, the decay speed may be equal to the release speed.

It should be understood that the performing envelope modulation on the first low-frequency input signal includes: adjusting parameters of four stages of the first low-frequency input signal, for example, adjusting duration of the four stages, and adjusting at least one of the startup voltage, the volume, and the release speed, so that the startup voltage of the second low-frequency input signal is higher than the startup voltage of the first low-frequency input signal, and that loudness of the second low-frequency input signal is greater than loudness of the first low-frequency input signal.

Operation 404: The electronic device determines an output signal of the speaker based on the second low-frequency input signal and the first high-frequency input signal.

In this embodiment of this application, the electronic device first performs frequency division on the input signal to divide the input signal into the first low-frequency input signal and the first high-frequency input signal, then processes the first low-frequency input signal, but does not process the first high-frequency input signal, and finally performs summation on the processed low-frequency input signal (that is, second low-frequency input data) and the first high-frequency input signal (a reverse process of frequency division), to complete processing of the input signal to obtain the output signal, and further sends the output signal to the speaker for playing.

Figure 7:
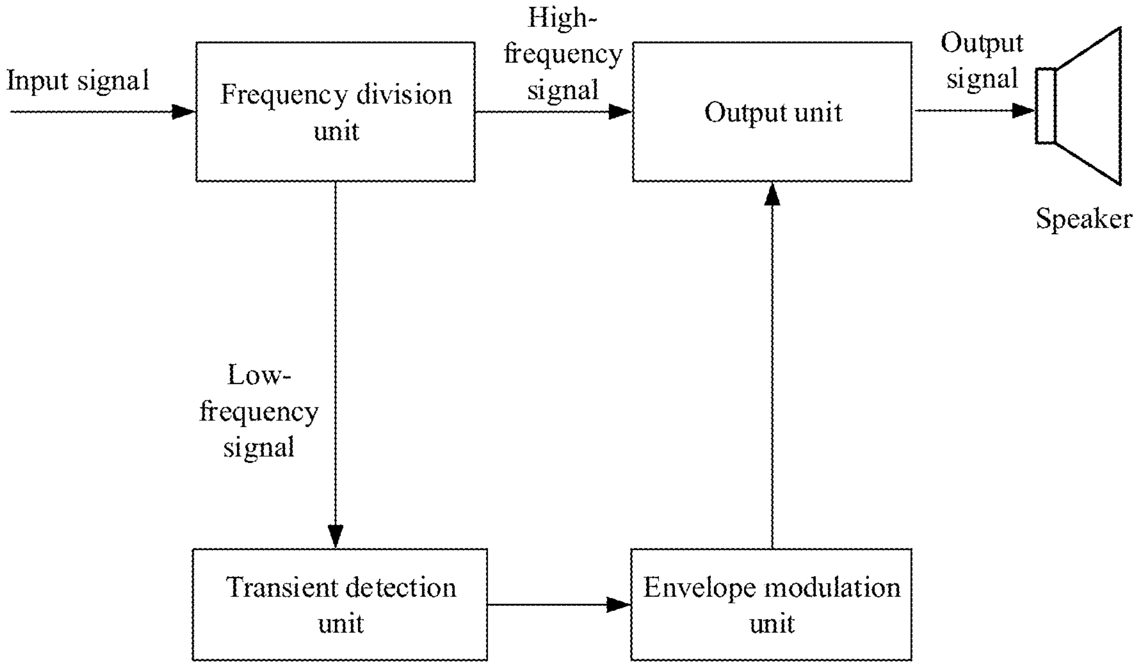
FIG. 7 is a schematic diagram of a framework of a speaker system according to an embodiment of this application.

For example, FIG. 7 shows a framework of a speaker system according to an embodiment of this application. As shown in FIG. 7, the speaker system includes a frequency division unit, a transient detection unit, an envelope modulation unit, and an output unit. The frequency division unit is configured to perform frequency division on an input signal to obtain a low-frequency input signal and a high-frequency input signal. The transient detection unit is configured to perform transient detection on the low-frequency input signal. The envelope modulation unit is configured to perform envelope modulation on the low-frequency input signal when the low-frequency input signal is a transient signal. The output unit is configured to mix the high-frequency input signal and an envelope-modulated low-frequency input signal to obtain an output signal, and then input the output signal to a speaker for playing. The operations in FIG. 4 and FIG. 5 may be understood with reference to FIG. 7.

In the method for improving sound quality of a speaker according to this embodiment of this application, transient detection is performed on the low-frequency signal in the input signal; and if the input signal is a transient signal, envelope modulation is used to enhance the transient signal. When the speaker plays a segment of an audio signal, sound quality of a low-frequency signal in the audio signal played by the speaker is related to performance of the speaker, and a transient signal in the low-frequency signal usually reflects important information of the audio signal. Therefore, the transient signal in the low-frequency signal is modulated to improve loudness of the low-frequency transient signal, and a dynamic range of the low-frequency transient signal is adjusted, so that when the speaker plays the processed audio signal, low-frequency sound effect of the audio signal is good, that is, sound quality of the speaker can be improved by using the technical solution in this embodiment of this application.

Figure 8:
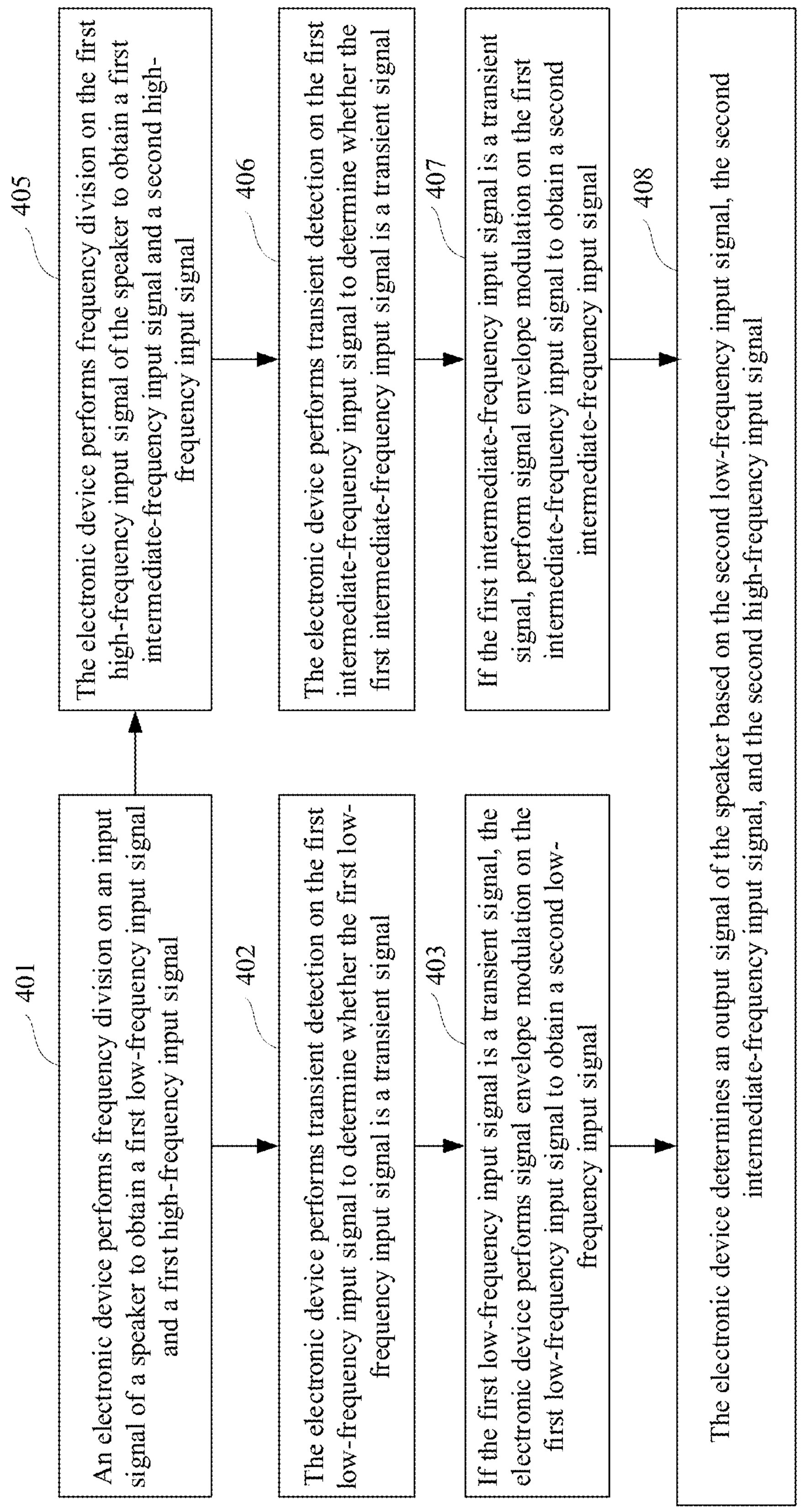
FIG. 8 is a schematic diagram of another method for improving sound quality of a speaker according to an embodiment of this application.

In an embodiment, with reference to FIG. 4, as shown in FIG. 8, the method for improving sound quality of a speaker according to this embodiment of this application further includes operation 405 to operation 407.

Operation 405: The electronic device performs frequency division on the first high-frequency input signal of the speaker to obtain a first intermediate-frequency input signal and a second high-frequency input signal.

The first intermediate-frequency input signal includes a signal whose frequency is lower than a second preset frequency in the first high-frequency input signal, the second high-frequency input signal includes a signal whose frequency is higher than the second preset frequency in the first high-frequency input signal, and the second preset frequency is higher than the first preset frequency.

For example, the second preset frequency may be a frequency within a range of 1500 Hz to 2500 Hz. For example, the second preset frequency may be 1500 Hz, 1750 Hz, 2000 Hz, 2250 Hz, or 2500 Hz.

It should be noted that a signal at the second preset frequency may be included in the first intermediate-frequency input signal, or may be included in the second high-frequency input signal, or may be included in both the first intermediate-frequency input signal and the second high-frequency input signal. This is not limited in this embodiment of this application.

In this embodiment of this application, the electronic device may perform frequency division on the input signal to divide the input signal into signals of two frequency bands, that is, the low-frequency input signal and the high-frequency input signal, and further perform frequency division on the high-frequency input signal to divide the high-frequency input signal into an intermediate-frequency input signal and a new high-frequency input signal.

In an embodiment, the electronic device may also directly perform frequency division on the input signal to divide the input signal into signals of three frequency bands, that is, a low-frequency signal, an intermediate-frequency signal, and a high-frequency signal. In other words, when the electronic device starts to process the input signal, the electronic device directly performs frequency division on the input signal to divide the input signal into the first low-frequency input signal, the first intermediate-frequency input signal, and the second high-frequency input signal.

Operation 406: The electronic device performs transient detection on the first intermediate-frequency input signal to determine whether the first intermediate-frequency input signal is a transient signal.

Operation 407: If the first intermediate-frequency input signal is a transient signal, the electronic device performs signal envelope modulation on the first intermediate-frequency input signal to obtain a second intermediate-frequency input signal.

A startup voltage of the second intermediate-frequency input signal is higher than a startup voltage of the first intermediate-frequency input signal, and loudness of the second intermediate-frequency input signal is greater than loudness of the first intermediate-frequency input signal.

A method for performing transient detection and envelope modulation on the first intermediate-frequency input signal in operation 406 and operation 407 is similar to the method for performing transient detection and envelope modulation on the first low-frequency input signal in the foregoing embodiment. Therefore, for related descriptions of operation 406 and operation 407, refer to the detailed descriptions of operation 402 and operation 403 in the foregoing embodiment. Details are not described herein again. It should be noted that a difference between the two methods is that some parameters set during transient detection and envelope modulation may be different.

Based on the foregoing operation 405 to operation 407, in this embodiment of this application, a method for determining the output signal of the speaker by the electronic device includes operation 408, that is, operation 404 is replaced with operation 408.

Operation 408: The electronic device determines the output signal of the speaker based on the second low-frequency input signal, the second intermediate-frequency input signal, and the second high-frequency input signal.

In an embodiment, the electronic device may perform summation on the second low-frequency input signal, the second intermediate-frequency input signal, and the second high-frequency input signal to obtain the output signal of the speaker.

Figure 9:
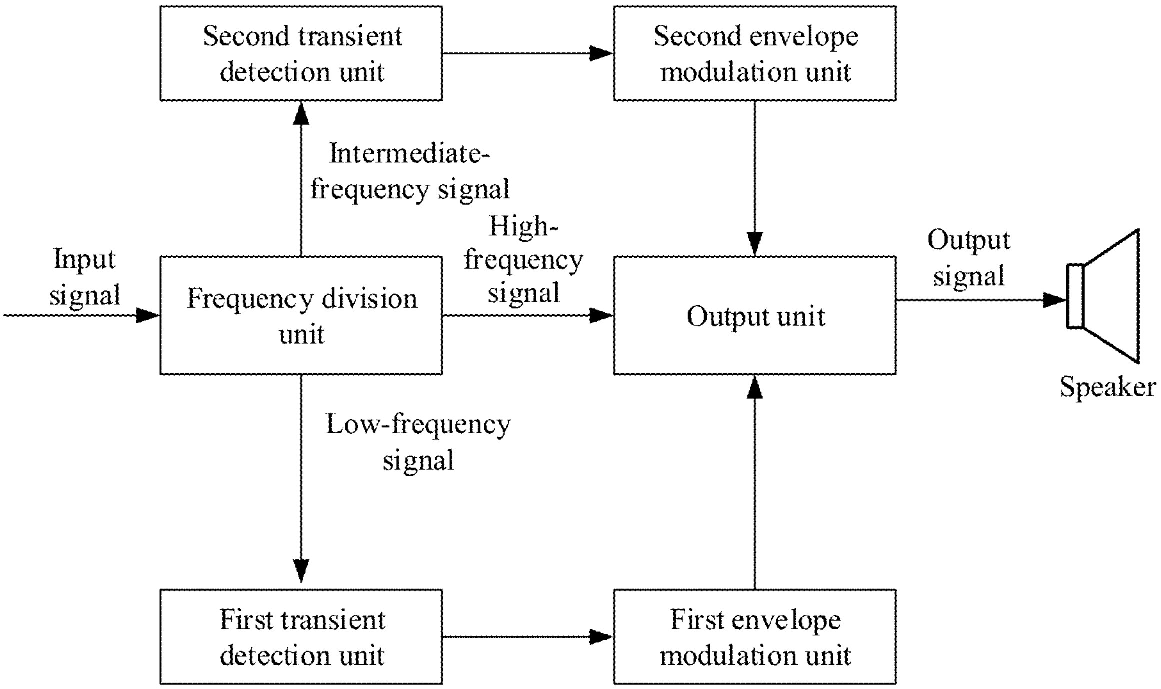
FIG. 9 is a schematic diagram of a framework of another speaker system according to an embodiment of this application.

For example, FIG. 9 shows a framework of another speaker system according to an embodiment of this application. As shown in FIG. 9, the speaker system includes a frequency division unit, a first transient detection unit, a first envelope modulation unit, a second transient detection unit, a second envelope modulation unit, and an output unit. The frequency division unit is configured to perform frequency division on an input signal to obtain a low-frequency input signal, an intermediate-frequency input signal, and a high-frequency input signal. The first transient detection unit is configured to perform transient detection on the low-frequency input signal. The first envelope modulation unit is configured to perform envelope modulation on the low-frequency input signal when the low-frequency input signal is a transient signal. The second transient detection unit is configured to perform transient detection on the intermediate-frequency input signal (for example, operation 406). The second envelope modulation unit is configured to perform envelope modulation on the intermediate-frequency input signal when the intermediate-frequency input signal is a transient signal (for example, operation 407). The output unit is configured to mix the high-frequency input signal, an envelope-modulated low-frequency input signal, and an envelope-modulated intermediate-frequency input signal to obtain an output signal, and then input the output signal to a speaker for playing (for example, operation 408).

In this embodiment of this application, transient detection is also performed on the intermediate-frequency signal in the input signal, and envelope modulation is performed on the transient signal, to enhance the intermediate-frequency signal, thereby improving overall sound quality of the speaker.

Figure 10:
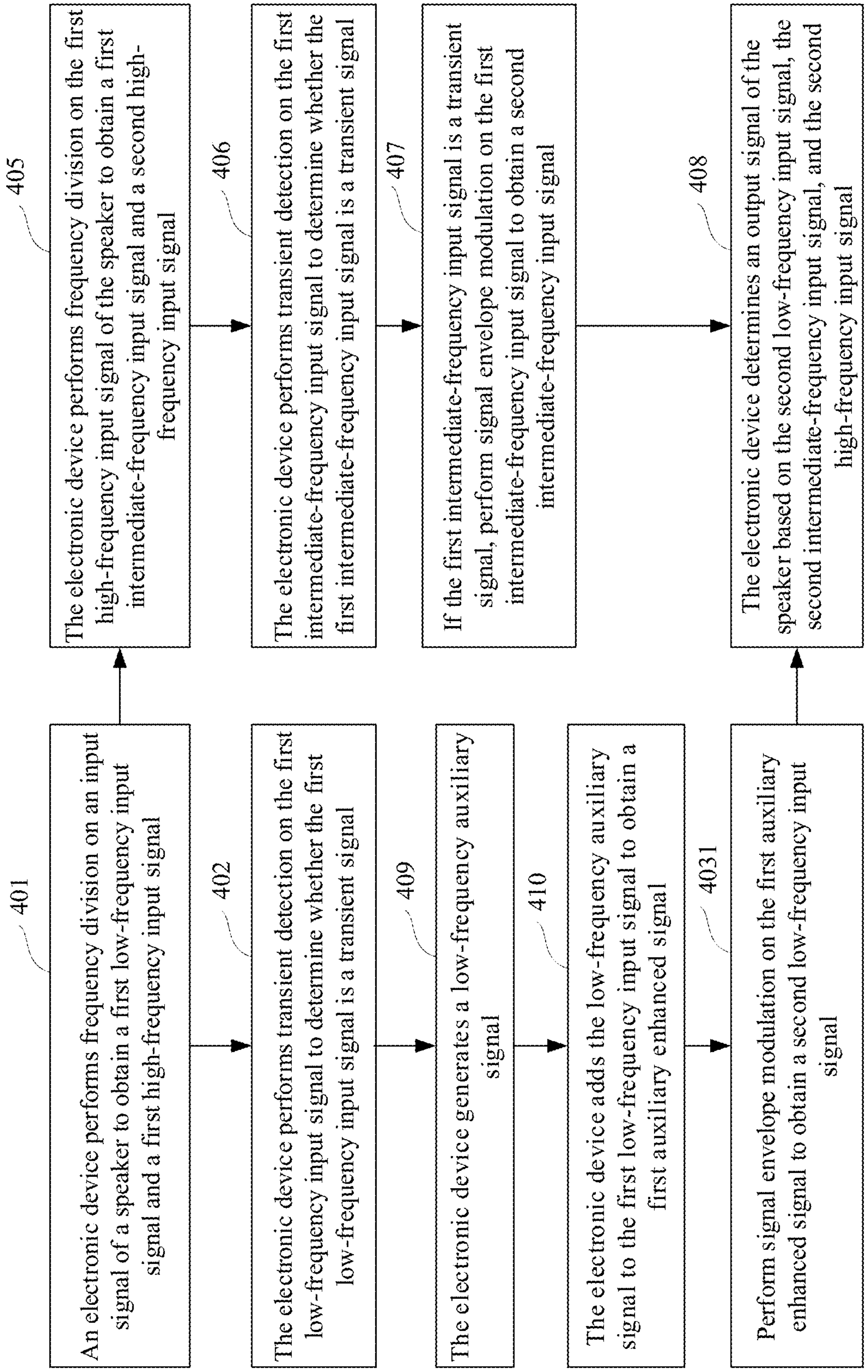
FIG. 10 is a schematic diagram of another method for improving sound quality of a speaker according to an embodiment of this application.

In an embodiment, with reference to FIG. 8, as shown in FIG. 10, the first low-frequency input signal is a transient signal, and the speaker of the electronic device is a micro speaker whose low-frequency playback capability is weak. Before signal envelope modulation is performed on the first low-frequency input signal (that is, before operation 403), the method for improving sound quality of a speaker according to this embodiment of this application further includes operation 409 and operation 410.

Operation 409: The electronic device generates a low-frequency auxiliary signal.

In this embodiment of this application, a function of the low-frequency auxiliary signal is to assist in enhancing loudness of the first low-frequency input signal, and optimize a dynamic range of the first low-frequency input signal.

In this embodiment of this application, a specific method for generating the low-frequency auxiliary signal includes the following operations.

First, a first auxiliary signal is generated. There may be a plurality of methods for generating the first auxiliary signal. In an embodiment, the first auxiliary signal meets:

$$signal\_h = e^{-A} \times \sin(2\pi f),$$

where signal_h represents the first auxiliary signal, A represents a signal amplitude influencing factor, and f is a center frequency of the speaker. A value range of A may be 10 to 50, and a specific value of A may be determined by a system or set by a user, for example, may be 10, 25, or 50. A value range of f may be 50 Hz to 150 Hz, and a specific value may be determined by the system or set by the user, for example, may be 50 Hz, 100 Hz, or 150 Hz.

Second, high-pass filtering is performed on the first auxiliary signal to obtain the low-frequency auxiliary signal.

In this embodiment of this application, the electronic device performs high-pass filtering on the first auxiliary signal, to filter out some signals whose frequencies are excessively low in the first auxiliary signal, to obtain the low-frequency auxiliary signal. In an embodiment, a cutoff frequency of the high-pass filtering may be about 1.5 times the center frequency f.

Operation 410: The electronic device adds the low-frequency auxiliary signal to the first low-frequency input signal to obtain a first auxiliary enhanced signal.

In this embodiment of this application, adding the low-frequency auxiliary signal to the first low-frequency input signal means performing summation on the first low-frequency input signal and the low-frequency auxiliary signal.

In an embodiment, the electronic device may add a proportion of low-frequency auxiliary signals to the first low-frequency input signal based on energy of the first low-frequency input signal. For example, if the energy of the first low-frequency input signal is low, energy that is a times that of the first low-frequency input signal is added to the first low-frequency input signal, where $0<a<1$.

Based on this, the performing signal envelope modulation on the first low-frequency input signal to obtain a second low-frequency input signal (that is, operation 403) is implemented by using operation 4031.

Operation 4031: Perform signal envelope modulation on the first auxiliary enhanced signal to obtain the second low-frequency input signal.

Figure 11:
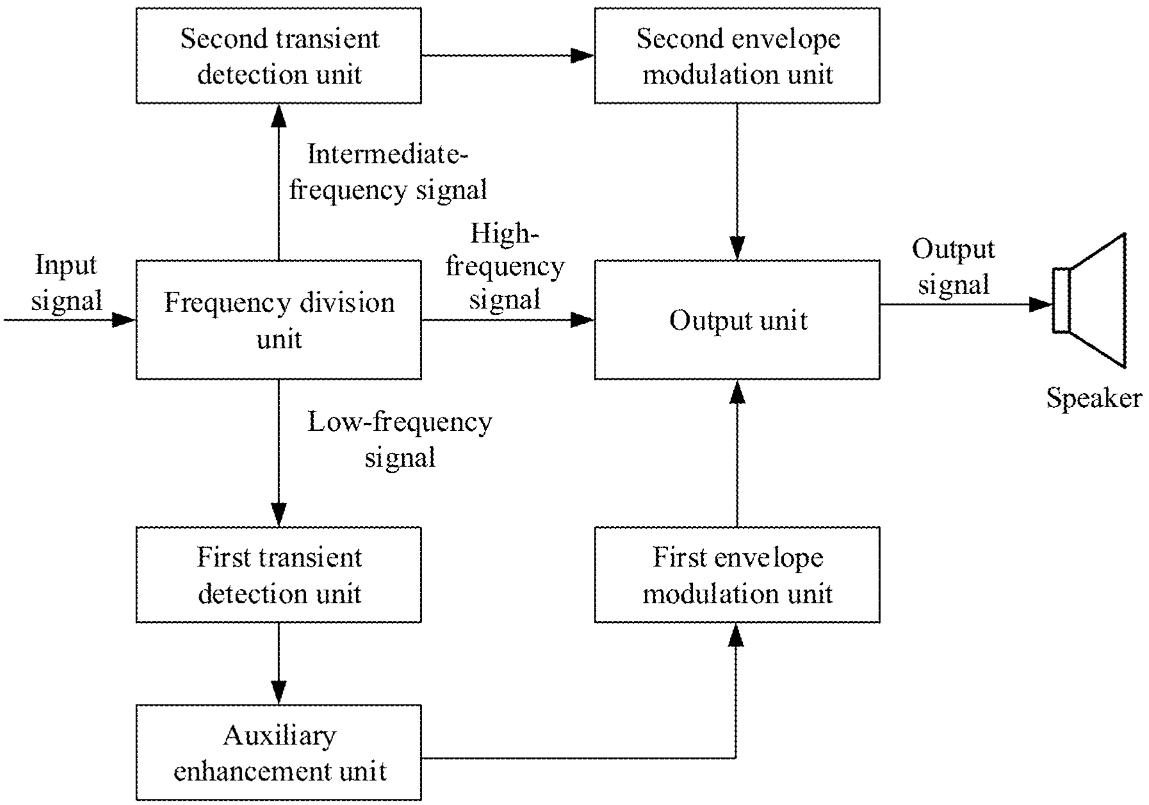
FIG. 11 is a schematic diagram of a framework of another speaker system according to an embodiment of this application.

For example, FIG. 11 is a schematic diagram of a framework of another speaker system according to an embodiment of this application. Based on the speaker system shown in FIG. 9, the speaker system further includes an auxiliary enhancement unit. The auxiliary enhancement unit performs the process of operation 409 and operation 410 to perform auxiliary enhancement on the first low-frequency input signal.

Figure 12:
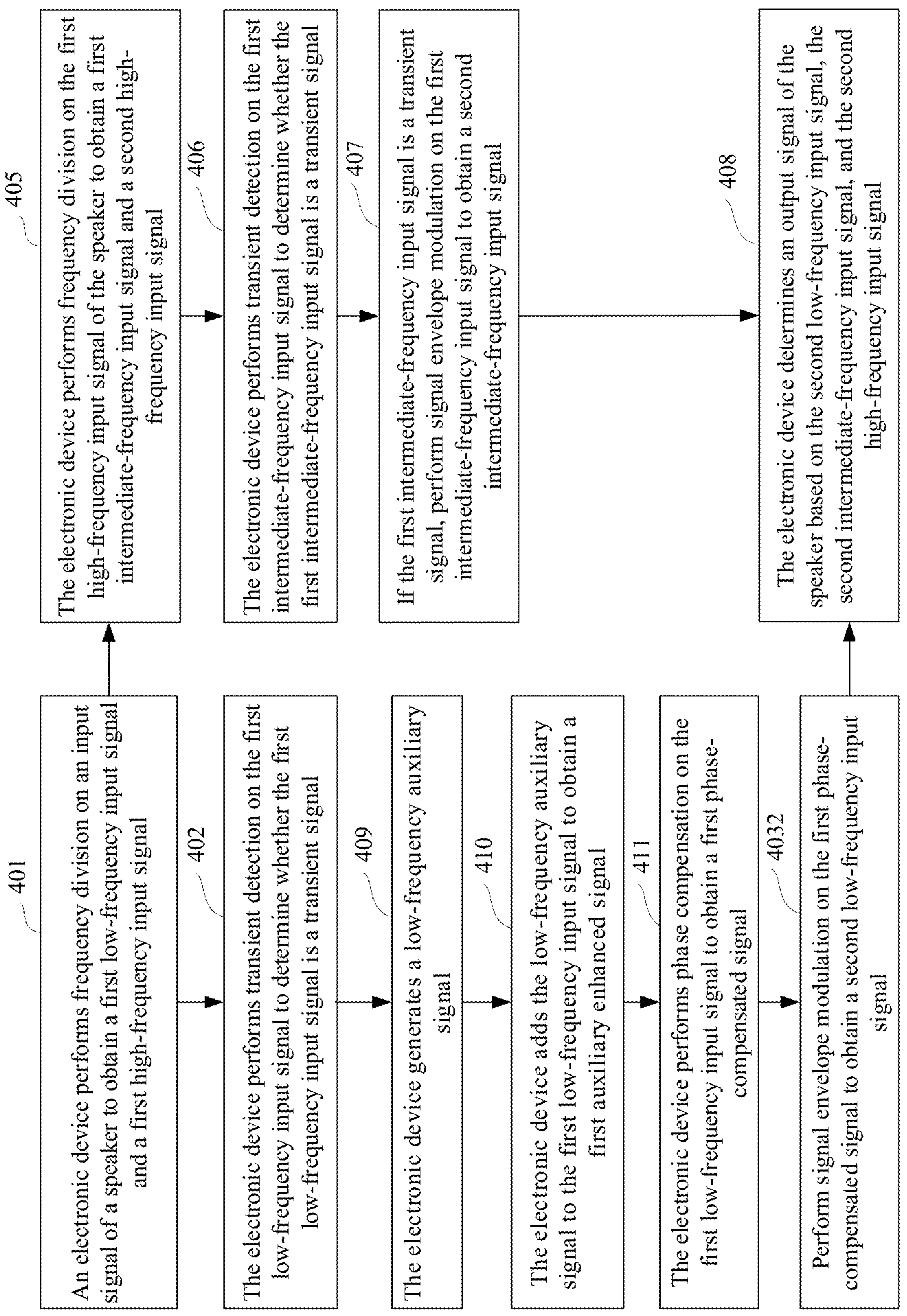
FIG. 12 is a schematic diagram of another method for improving sound quality of a speaker according to an embodiment of this application.

In an embodiment, with reference to FIG. 10, as shown in FIG. 12, the first low-frequency input signal is a transient signal, and before the performing signal envelope modulation on the first low-frequency input signal, the method for improving sound quality of a speaker according to this embodiment of this application may further include operation 411.

Operation 411: The electronic device performs phase compensation on the first low-frequency input signal to obtain a first phase-compensated signal.

It should be understood that the first phase-compensated signal is a phase-compensated first low-frequency input signal. In the process of performing frequency division and auxiliary enhancement on the input signal by the electronic device, a phase of the first low-frequency input signal may be affected. Consequently, a deviation is caused to the phase of the low-frequency input signal, and the phase is no longer a linear phase. Therefore, necessary linear phase compensation is performed on the first low-frequency input signal, to correct the phase of the first low-frequency input signal to the linear phase, thereby ensuring low-frequency sound quality.

In an embodiment, the electronic device calculates a signal (which may be an electrical signal or a sound signal) obtained after a test signal is processed by the speaker system, generates a phase compensation filter (e.g., a coefficient of the phase compensation filter is generated) based on a calculation result of the test signal and a preset standard signal, and then processes the first low-frequency input signal by using the phase compensation filter, to implement phase compensation for the first low-frequency input signal.

Based on this, the performing signal envelope modulation on the first low-frequency input signal to obtain a second low-frequency input signal (e.g., operation 403) is implemented by using operation 4032.

Operation 4032: Perform signal envelope modulation on the first phase-compensated signal to obtain the second low-frequency input signal.

Figure 13:
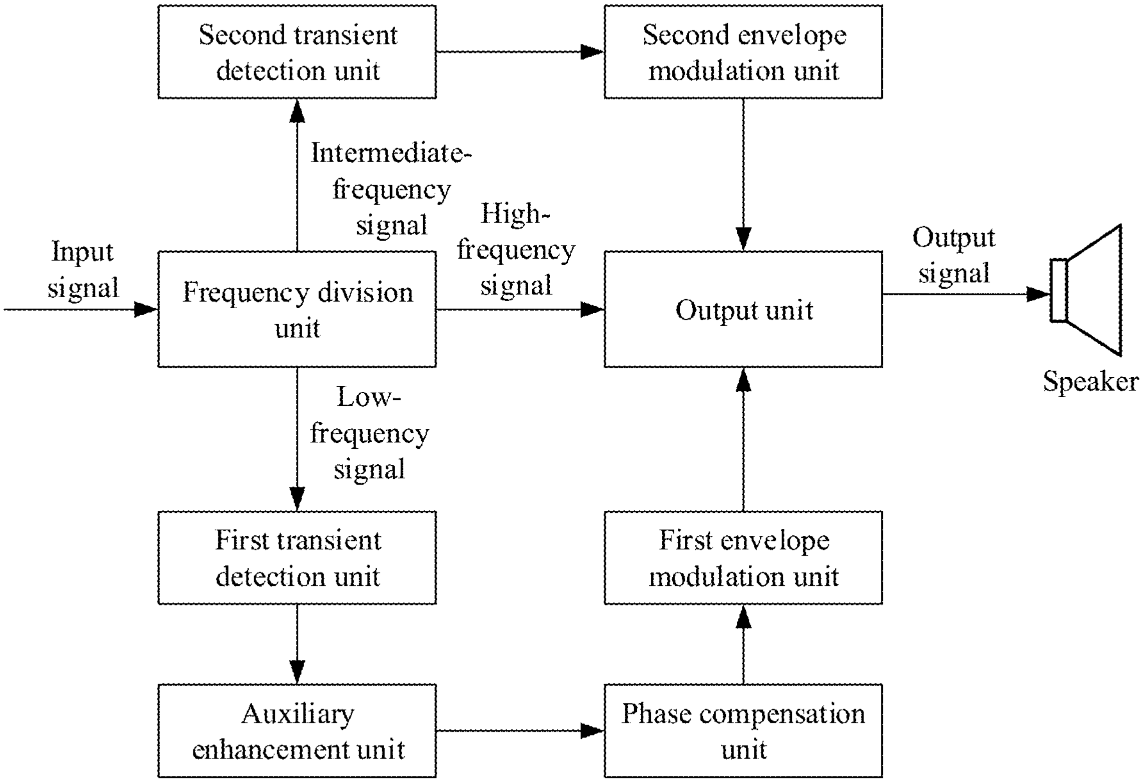
FIG. 13 is a schematic diagram of a framework of another speaker system according to an embodiment of this application.

For example, FIG. 13 is a schematic diagram of a framework of another speaker system according to an embodiment of this application. Based on the speaker system shown in FIG. 11, the speaker system further includes a phase compensation unit. The phase compensation unit performs the process of operation 411 to perform linear phase compensation on the first low-frequency input signal.

In an embodiment, after performing operation 410 and before performing envelope modulation on the first low-frequency input signal (operation 403), the electronic device may perform operation 411, that is, the electronic device performs phase compensation on the auxiliary enhanced first low-frequency input signal. Certainly, when the electronic device does not perform operation 409 and operation 410, after detecting the first low-frequency input signal (that is, operation 402), and before performing envelope modulation on the first low-frequency input signal (operation 403), the electronic device may perform operation 410. This is determined based on an actual situation, and is not limited in this embodiment of this application.

So far, the electronic device has completed transient enhancement processing on the input signal of the speaker. In this way, low-frequency loudness of the speaker can be improved, a dynamic change of the speaker can be adjusted, and sound quality of the speaker can be improved.

Figure 14:
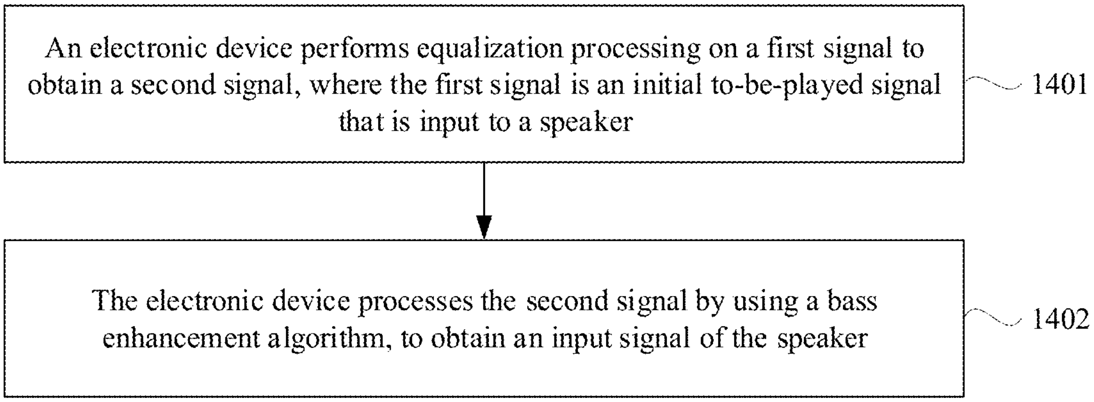
FIG. 14 is a schematic diagram of a framework of another speaker system according to an embodiment of this application.

It should be noted that, before operation 401 to operation 404, the electronic device may further process an initial signal to be played by the speaker, to obtain an input signal for transient enhancement processing. As shown in FIG. 14, before operation 401 to operation 404, the method for improving sound quality of a speaker according to this embodiment of this application further includes operation 1401 and operation 1402.

Operation 1401: The electronic device performs equalization processing on a first signal to obtain a second signal, where the first signal is an initial to-be-played signal that is input to the speaker.

The initial to-be-played signal of the speaker may be an audio signal captured by the electronic device, or may be an audio signal received by the electronic device from another device. This is not limited in this embodiment of this application.

In an embodiment, in this embodiment of this application, a specific method for performing equalization processing on the first signal may be: performing equalization processing on the first signal by using a biquard filter, to improve a low-frequency response of the speaker. For a process of processing the first signal by using the biquard filter, refer to an operating principle of an existing biquard filter. Details are not described herein again.

Operation 1402: The electronic device processes the second signal by using a bass enhancement algorithm, to obtain the input signal of the speaker.

In this embodiment of this application, the processing the second signal by using a bass enhancement algorithm is performing filtering processing on the second signal by using a low-frequency shelving filter, to enhance low-frequency loudness (which may also be referred to as a low-frequency amplitude) of the second signal. In an embodiment, operation 1402 includes operation 1402*a* and operation 1402*b*.

Operation 1402*a*: The electronic device determines a gain of a low-frequency shelving filter based on energy of a low-frequency signal in the second signal.

The low-frequency shelving filter is configured to control loudness of the low-frequency signal in the second signal.

Figure 15:
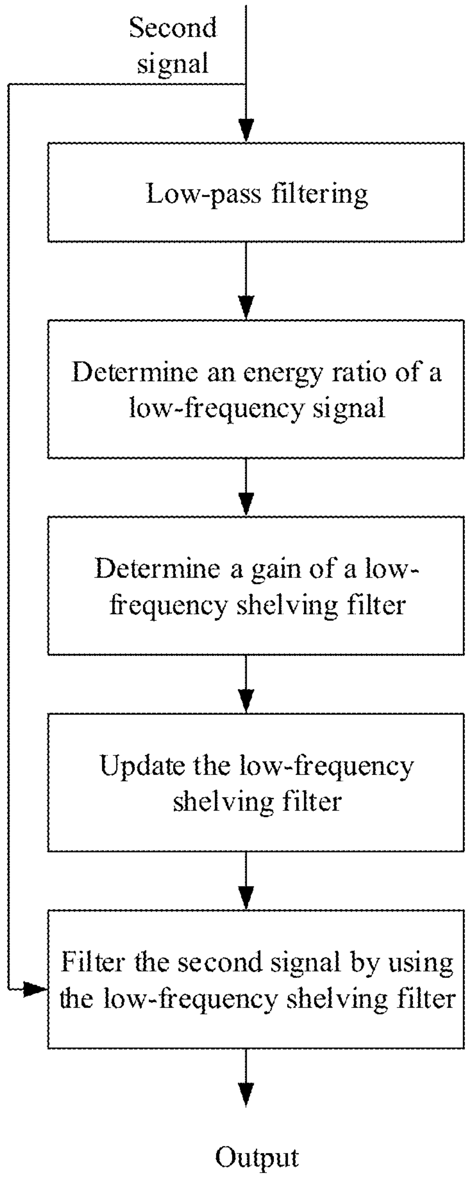
FIG. 15 is a schematic flowchart of a low-frequency enhancement algorithm according to an embodiment of this application.

In this embodiment of this application, referring to a schematic flowchart of a low-frequency enhancement algorithm shown in FIG. 15, first, the electronic device performs low-pass filtering on the second signal to obtain the low-frequency signal in the second signal; and then the electronic device calculates a ratio of energy of each point (value) in the low-frequency signal to total energy of the second signal, that is, calculates an energy ratio of the low-frequency signal.

Further, the gain of the low-frequency shelving filter is determined based on the energy ratio of the low-frequency signal. In an embodiment, a basic gain of the low-frequency shelving filter is first determined, and then the gain of the low-frequency shelving filter is obtained by smoothing the basic gain.

In an embodiment, a formula for smoothing the gain of the low-frequency shelving filter is:

$$G\_\text{current}=G_s*a+(1-a)*G\_\text{before},$$

where G_current represents a gain of the low-frequency shelving filter corresponding to the current frame, a is a smoothing coefficient of a filtering gain, G_before is a filtering gain of a previous frame of the current frame, and $G_s$ represents the basic gain of the low-frequency shelving filter.

A method for determining the basic gain of the low-frequency shelving filter includes:

For a low-frequency signal whose energy ratio is less than or equal to a first threshold, $G_s$=target, where target G is a preset gain.

For a low-frequency signal whose energy ratio is greater than the first threshold and less than a second threshold, $G_s$=target G−S*(ratio−rth1), where S is a gain smoothing coefficient, ratio is an energy ratio of the low-frequency signal, and rth1 is the first threshold.

For a low-frequency signal whose energy ratio is greater than the first threshold and whose energy ratio is greater than or equal to the second threshold, $G_s$=gth*target G, where gth is a gain coefficient.

Operation 1402*b*: The electronic device filters the second signal by using the low-frequency shelving filter, to obtain the input signal of the speaker.

Figure 16:
FIG. 16 is a schematic diagram of a framework of another speaker system according to an embodiment of this application.

For example, FIG. 16 is a schematic diagram of a framework of another speaker system according to an embodiment of this application. The speaker system includes a determining unit, a gain update unit, and a filtering unit. The determining unit is configured to determine an energy ratio of a low-frequency signal in a second signal. The gain update unit is configured to determine a gain of a low-frequency shelving filter based on the energy ratio of the low-frequency signal in the second signal. The filtering unit is configured to filter the second signal, where a filtered signal is used as an input signal in a process of transient enhancement processing (that is, the input signal of the speaker in operation 401).

In this embodiment of this application, loudness of low-frequency signals with different energy is differentially improved to different degrees based on energy of the low-frequency signal in the second signal. To be specific, different gains are set for the low-frequency signals based on the energy of the low-frequency signals. As can be learned from above, in operation 1402, the loudness of the low-frequency signal in the second signal is dynamically and adaptively improved based on an energy characteristic of the low-frequency signal in the second signal. In this way, clarity of the low-frequency signal can be improved.

In an embodiment, in this embodiment of this application, after the transient enhancement processing is performed on the input signal of the speaker to obtain the output signal of the speaker, the electronic device may further continue to process the output signal, to further improve bass sound quality of the micro speaker. It should be noted that, for ease of description, in the following embodiment, output signals obtained after processing in operation 404 is completed are collectively referred to as a first output signal.

After operation 404, the method for improving sound quality of a speaker according to this embodiment of this application may further include: performing virtual bass processing on the first output signal to obtain a virtual bass output signal.

It should be understood that the virtual bass processing is a method for improving bass sound effect based on psychoacoustics. Measured from a perspective of psychoacoustics, psychologically perceived low-frequency loudness of an output signal after the virtual bass processing (that is, the virtual bass output signal) is greater than psychologically perceived low-frequency loudness of the first output signal. In an embodiment, the psychologically perceived low-frequency loudness may be determined based on a psychoacoustic model.

Figure 17:
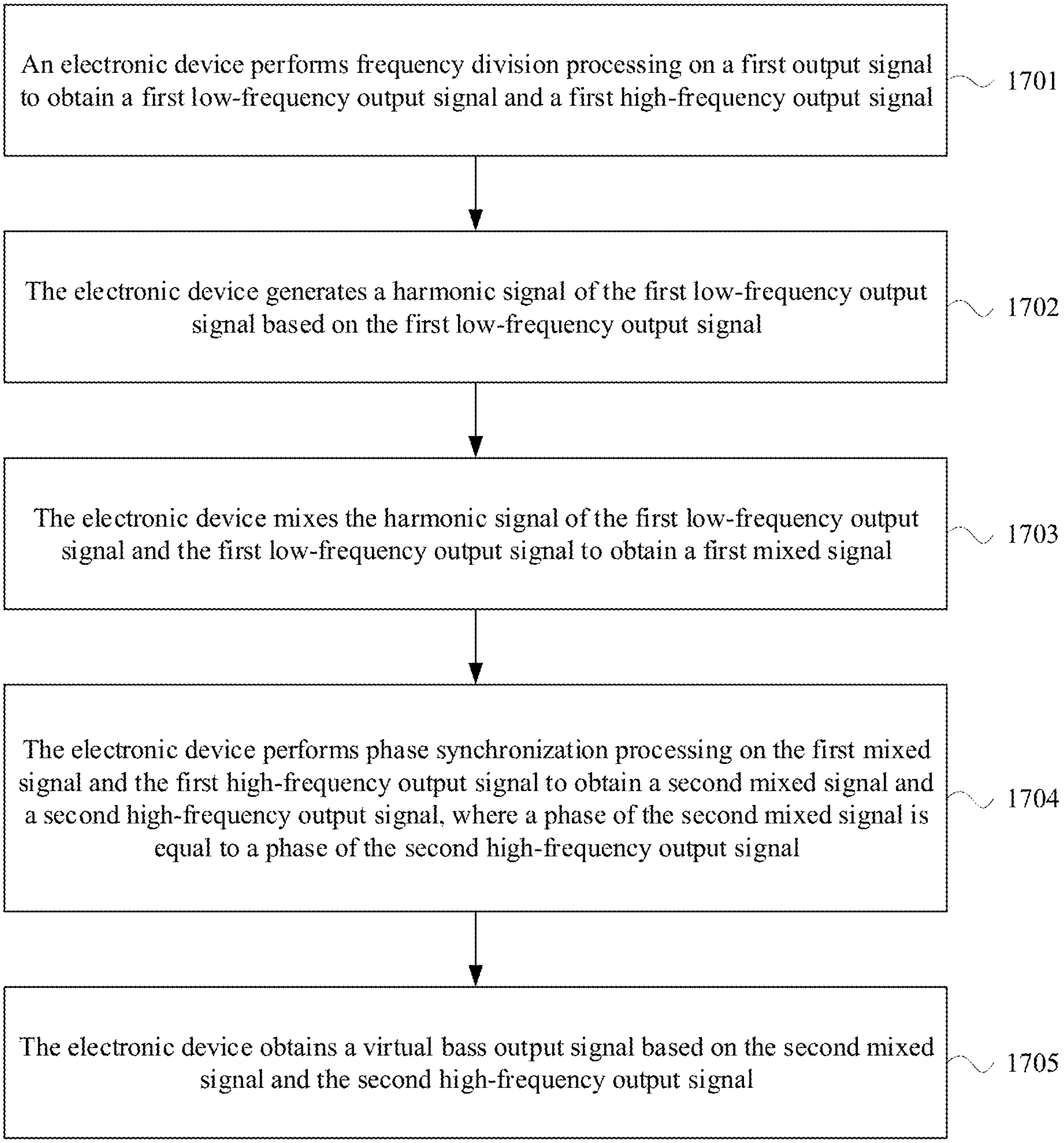
FIG. 17 is a schematic diagram of another method for improving sound quality of a speaker according to an embodiment of this application.

In an embodiment, as shown in FIG. 17, a method for performing virtual bass processing on the first output signal to obtain a virtual bass output signal may include operation 1701 to operation 1705.

Operation 1701: The electronic device performs frequency division processing on the first output signal to obtain a first low-frequency output signal and a first high-frequency output signal.

The first low-frequency output signal includes a signal whose frequency is lower than a third preset frequency in the first output signal, and the first high-frequency output signal includes a signal whose frequency is higher than the third preset frequency in the first output signal.

For example, the third preset frequency may be a frequency within a range of 100 Hz to 400 Hz. For example, the third preset frequency may be 100 Hz, 150 Hz, 250 Hz, 300 Hz, or 400 Hz.

It should be noted that a signal at the third preset frequency may be included in the first low-frequency output signal, or may be included in the first high-frequency output signal, or may be included in both the first low-frequency output signal and the first high-frequency output signal. This is not limited in this embodiment of this application.

Operation 1702: The electronic device generates a harmonic signal of the first low-frequency output signal based on the first low-frequency output signal.

For example, the harmonic signal of the first low-frequency output signal may be generated by using the following formula:

$$\text{Signal\_out}=\cos(\text{Coeff}_d\times\text{Signal\_in})-b_f\times\text{Signal\_in}$$

$$\text{Coeff}_d=a_f\times(0.5\pi-0.8)+0.8,$$

where $a_f$ and $b_f$ are input coefficients, $0<a_f<1$, $0<b_f<1$, and Signal_in is the first low-frequency output signal; and $a_f$ is used to adjust a ratio of amplitudes of harmonic signals of different frequencies, and $b_f$ is used to adjust a ratio of total energy of the harmonic signals to total energy of the first low-frequency output signal (the first low-frequency output signal may also be referred to as a fundamental wave signal).

In an embodiment, a quantity of generated harmonic signals of the first low-frequency output signal and harmonic frequencies may be determined based on an actual requirement. For example, three harmonic signals of the first low-frequency output signal may be generated, where the harmonic frequencies are 3f, 5f, and 7f in sequence, and f is an original frequency of the first low-frequency output signal.

Operation 1703: The electronic device mixes the harmonic signal of the first low-frequency output signal and the first low-frequency output signal to obtain a first mixed signal.

In an embodiment, in this embodiment of this application, the harmonic signal of the first low-frequency output signal and the first low-frequency output signal may be mixed according to a proportion based on energy of the signals.

In an embodiment, the electronic device may generate a harmonic signal based on a normalized first low-frequency output signal after normalizing the first low-frequency output signal, and then mix the generated harmonic signal and the normalized first low-frequency output signal.

Operation 1704: The electronic device performs phase synchronization processing on the first mixed signal and the first high-frequency output signal to obtain a second mixed signal and a second high-frequency output signal, where a phase variation of the second mixed signal is equal to a phase variation of the second high-frequency output signal.

Operation 1705: The electronic device obtains the virtual bass output signal based on the second mixed signal and the second high-frequency output signal.

In an embodiment, after obtaining the first mixed signal, the electronic device may first perform band-pass filtering on the first mixed signal to filter out possible spurious-wave components of the high-frequency signal and the low-frequency signal in the first mixed signal, detect a maximum amplitude of a filtered first mixed signal, and then restore the first mixed signal based on the maximum amplitude (that is, a reverse process of normalization) to obtain the restored first mixed signal. Further, the electronic device performs low-pass filtering on the restored first mixed signal to filter high-frequency noise, to obtain a denoised first mixed signal. Finally, an all-pass filter is used to perform phase synchronization on the denoised first mixed signal and the first high-frequency output signal to obtain the virtual bass output signal.

Figure 18:
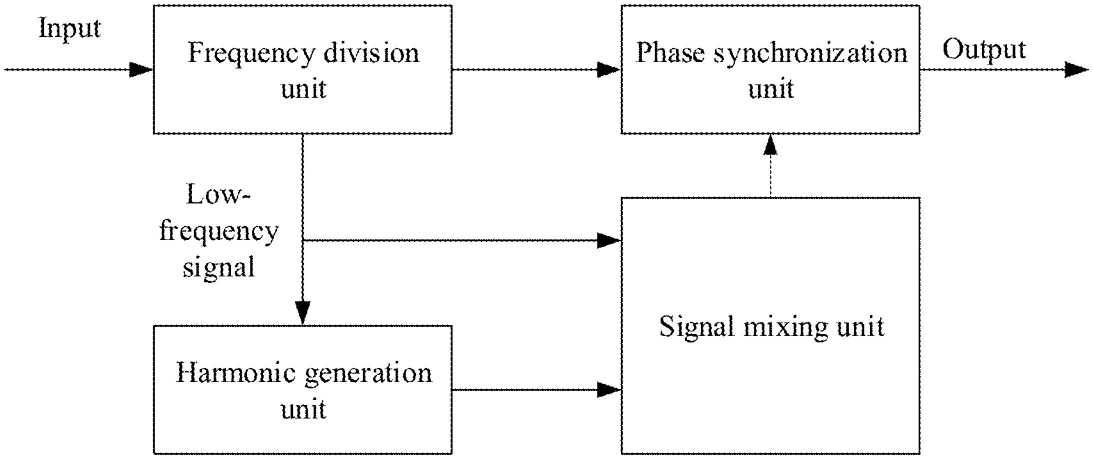
FIG. 18 is a schematic diagram of a framework of another speaker system according to an embodiment of this application.

For example, FIG. 18 shows a framework of a speaker system according to an embodiment of this application. As shown in FIG. 18, the speaker system includes a frequency division unit, a harmonic generation unit, a signal mixing unit, and a phase synchronization unit. The frequency division unit performs frequency division on a first output signal. The harmonic generation unit generates a harmonic signal of a first low-frequency output signal after frequency division. The signal mixing unit mixes the harmonic signal and the first low-frequency output signal to obtain a first mixed signal. The phase synchronization unit performs phase synchronization on the first mixed signal and a first high-frequency signal to obtain a second mixed signal and a second high-frequency output signal, and obtains a virtual bass output signal based on the second mixed signal and the second high-frequency output signal.

In an embodiment, after the virtual bass processing is performed on the first output signal of the speaker, the electronic device may further continue to perform processing (displacement control) on the virtual bass output signal, to prevent a displacement of the diaphragm of the speaker from exceeding a displacement protection threshold of the speaker. It should be noted that, for ease of description, in the following embodiments, virtual bass output signals are collectively referred to as a second output signal.

Figure 19:
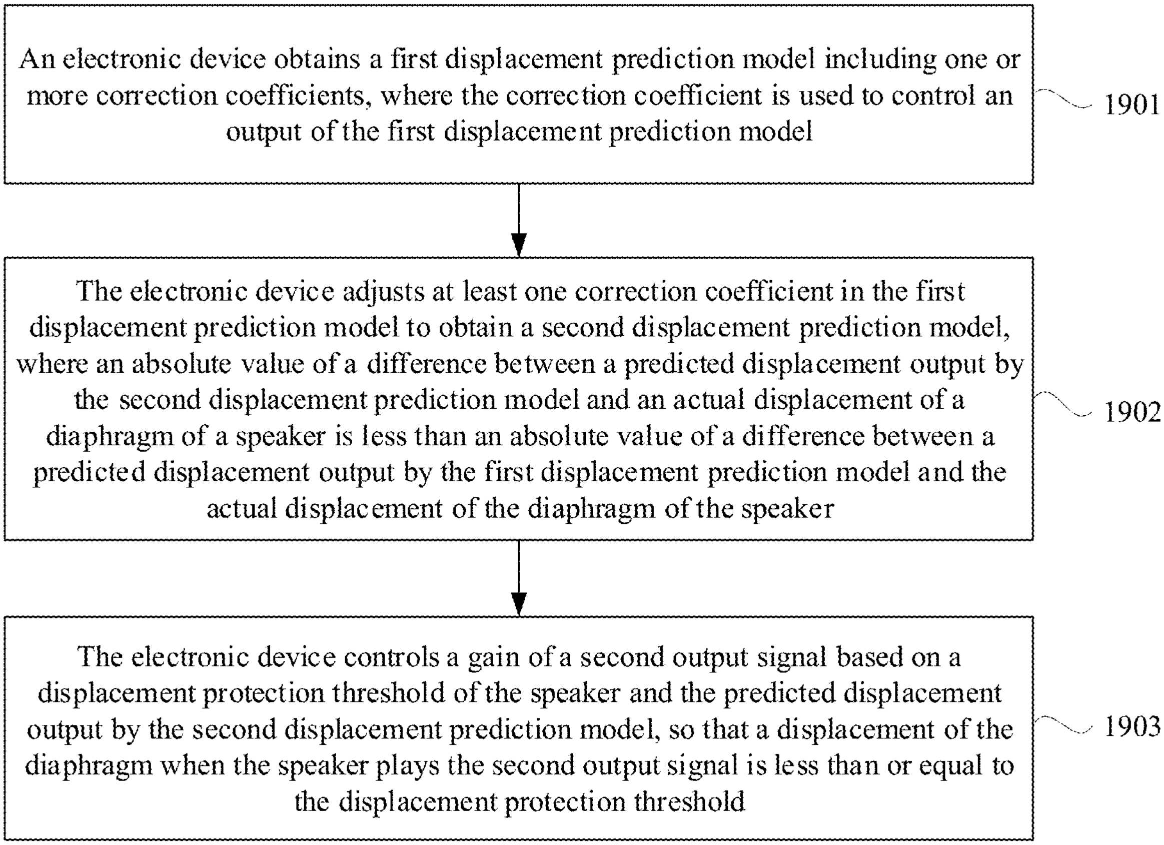
FIG. 19 is a schematic diagram of another method for improving sound quality of a speaker according to an embodiment of this application.

As shown in FIG. 19, before operation 404, the method for improving sound quality of a speaker according to this embodiment of this application may further include operation 1901 to operation 1903.

Operation 1901: The electronic device obtains a first displacement prediction model including one or more correction coefficients, where the correction coefficient is used to control an output of the first displacement prediction model.

The first displacement prediction model is used to simulate performance of the speaker to predict the displacement of the diaphragm of the speaker, and the one or more correction coefficients are used to control an output of the first displacement prediction model.

For example, the first displacement prediction model may meet the following expression:

$$H(z)=\frac{bx_0+bx_1*z^{-1}+bx_2*z^{-2}+bx_3*z^{-3}}{ax_0+ax_1*z^{-1}+ax_2*z^{-2}+ax_3*z^{-3}}.$$

In the expression, $ax_0=1$, $$ax_1=\frac{((-2*d_2+2*d_0)-b_j*\gamma)}{b_j},$$

$$ax_2=\frac{((d_2-d_1+d_0)-(-2*d_2+2*d_0)*\gamma)}{b_j},\text{ and}$$

$$ax_3=\frac{-(d_2-d_1+d_0)*\gamma}{b_j};$$

$$d_0=\alpha*spk.Kms*spk.\mathrm{Re},$$

$$d_1=\frac{\left(\alpha*spk.\mathrm{Re}*spk.\mathrm{Rms}+(\beta*spk.Bl)^2\right)*2}{T_s},$$

$$d_2=\frac{\alpha*spk.\mathrm{Re}*spk.Mms*4}{T_s^2},$$

$$b_j=d_0+d_1+d_2,\text{ and }T_s=\frac{1}{f_s};\text{ and}$$

$$bx_0=bx_1=\frac{\beta*spk.Bl}{\Omega*b_j},\text{ and }bx_2=bx_3=-bx_0,$$

where $f_s$ is a sampling frequency, α, β, γ, and Ω are correction coefficients, α may be used to adjust a low-frequency output of the displacement prediction model, β is used to adjust an output of a frequency range that is of the displacement prediction model and that includes a resonance frequency of the speaker, γ is used to adjust an intermediate-frequency output of the displacement prediction model, and Ω is used to adjust a full frequency band output of the displacement prediction model; spk.Bl is a magnetic coefficient of the speaker in an initial parameter, spk.Kms is a stiffness coefficient of the speaker in an initial parameter, and spk.Rms is power of the speaker in an initial parameter; and ax and bx are coefficients of a generated IIR filter.

It should be noted that the expression of the first displacement prediction model, a quantity of correction coefficients included in the first displacement prediction model, and content controlled by each correction coefficient may be configured based on an actual requirement. This is not limited in this embodiment of this application.

In an embodiment, depending on different application scenarios and different content of the first displacement prediction model, this embodiment of this application may include but is not limited to the following several cases.

Case 1: In an application scenario in which the displacement of the diaphragm of the speaker is protected at a development or production commissioning stage of the electronic device, no displacement prediction model is configured in the electronic device, and the electronic device configures an initial model as the first displacement prediction model in operation 1901.

In case 1, a correction coefficient in the initial model may be 1.

Further, the displacement prediction model may further include an initial parameter, and the initial parameter is a parameter that is in the displacement prediction model and that is related to a hardware feature of the speaker. Correspondingly, in case 1, the method may further include: obtaining an impedance curve of the speaker, and determining the initial parameter of the displacement prediction model based on the impedance curve. The initial parameter is a parameter that is in the displacement prediction model and that is related to the hardware feature of the speaker.

For example, the initial parameter may be a magnetic coefficient spk.Bl of the speaker, a stiffness coefficient spk.Kms or power spk.Rms of the speaker.

For example, the obtaining an impedance curve of the speaker, and determining the initial parameter of the displacement prediction model based on the impedance curve includes: inputting a preset input signal into the speaker, and capturing a voltage and a current of the speaker; determining the impedance curve of the speaker based on the voltage and the current; and determining the initial parameter of the displacement prediction model based on the impedance curve through curve fitting or parameter recognition.

The preset input signal may be a specific noise signal or another signal. This is not limited. For example, a voltage and a corresponding current signal of the speaker in a time period may be captured. For Fourier transform is performed, and a voltage spectrum is divided by a current spectrum to obtain an impedance curve.

Case 2: In an application scenario in which the displacement of the diaphragm of the speaker is protected at a development or production commissioning stage of the electronic device, an initial model is configured in the electronic device but a correction coefficient is not adjusted, and the electronic device obtains the configured initial model as the first displacement prediction model in operation 1901.

Case 3: In an application scenario in which the displacement of the diaphragm of the speaker is protected at a use stage after the electronic device is delivered from a factory, the first displacement prediction model may be a displacement prediction model stored in the electronic device and used to predict the displacement of the diaphragm of the speaker when operation 1901 is performed. The first displacement prediction model configured in the electronic device may be a displacement prediction model obtained after correction in case 1 or case 2.

Operation 1902: The electronic device adjusts at least one correction coefficient in the first displacement prediction model to obtain a second displacement prediction model, where an absolute value of a difference between a predicted displacement output by the second displacement prediction model and an actual displacement of the diaphragm of the speaker is less than an absolute value of a difference between a predicted displacement output by the first displacement prediction model and the actual displacement of the diaphragm of the speaker.

The actual displacement of the diaphragm of the speaker is an actual measured value of a movement distance of the diaphragm relative to an initial location.

It may be understood that the second displacement prediction model is obtained after the correction coefficient of the first displacement prediction model is adjusted, and that an expression of the second displacement prediction model is the same as the expression of the first displacement prediction model.

In an embodiment, the actual displacement of the speaker may be obtained through measurement, and then the correction coefficient of the first displacement prediction model is repeatedly adjusted according to a correction coefficient adjustment rule, so that the second displacement prediction model is obtained.

For example, the actual displacement of the diaphragm of the speaker may be measured by using a laser, or the actual displacement of the diaphragm of the speaker may be measured by using another method. This is not limited in this embodiment of this application.

It should be understood that content of the correction coefficient adjustment rule may be configured based on an actual requirement. This is not limited in this embodiment of this application.

For example, the correction coefficient adjustment rule may be: configuring an adjustment step for each correction coefficient, and sequentially adjusting each correction coefficient based on a preset correction coefficient adjustment sequence and the adjustment step until the second displacement prediction model is obtained.

For example, the correction coefficient adjustment rule may be: comparing the predicted displacement output by the first displacement prediction model with the actual displacement of the diaphragm when the speaker plays the input signal input into the first displacement prediction model, and looking up a preset correspondence based on a value relationship between the predicted displacement output by the first displacement prediction model and the actual displacement, to obtain content of an adjusted correction coefficient and an adjustment value. The preset correspondence stores different value relationships between predicted displacements and actual displacements, to-be-adjusted correction coefficients corresponding to different value relationships, and adjustment values.

Operation 1903: The electronic device controls a gain of the second output signal based on the displacement protection threshold of the speaker and the predicted displacement output by the second displacement prediction model, so that a displacement of the diaphragm when the speaker plays the second output signal is less than or equal to the displacement protection threshold.

In an embodiment, the displacement protection threshold of the speaker is a maximum displacement of the diaphragm of the speaker.

In an embodiment, when the predicted displacement is greater than or equal to the displacement protection threshold, the electronic device decays the second output signal as a whole, so that the displacement of the diaphragm when the speaker plays the second output signal is less than or equal to the displacement protection threshold of the speaker.

In another embodiment, based on a principle that the displacement of the speaker is mainly generated by a low-frequency signal, when the predicted displacement is greater than or equal to the displacement protection threshold, a low-frequency signal in the second output signal may be suppressed by using a high-pass filter, and the gain of the second output signal of the speaker is controlled by using a medium-high frequency signal, so that loudness of the speaker is ensured while the displacement of the speaker is reduced. In an embodiment, the electronic device determines a frequency parameter of the high-pass filter based on the predicted displacement output by the second displacement prediction model, and then filters the second output signal by using the high-pass filter, so that the displacement of the diaphragm when the speaker plays the second output signal is less than or equal to the displacement protection threshold of the speaker.

In this embodiment of this application, a specific method for determining the frequency parameter of the high-pass filter by the electronic device based on the predicted displacement output by the second displacement prediction model is as follows: The electronic device filters, by using n groups of frequency parameters, the predicted displacement output by the second displacement prediction model; selects two groups of frequency parameters with filtering output values located on two sides of the displacement protection threshold and with smallest absolute values of differences between the displacement protection threshold and the two groups of frequency parameters and selects a first frequency parameter from a frequency parameter interval including the two groups of frequency parameters as the frequency parameter of the high-pass filter, where passbands of the n groups of frequency parameters are different, and n is greater than 2.

Specific values of the n groups of frequency parameters may be configured based on actual application experience. Details are not described again in this embodiment of this application.

It should be understood that the first frequency parameter selected from the frequency parameter interval including the two groups of frequency parameters may be a passband of a high-pass filter indicated by the first frequency parameter, where the passband is located between channels of high-pass filters indicated by frequency parameters in the two groups of frequency parameters.

In an embodiment, the selecting a first frequency parameter from a frequency parameter interval including the two groups of frequency parameters may be implemented as: selecting a median value of the two groups of frequency parameters from the frequency parameter interval including the two groups of frequency parameters as the first frequency parameter.

For example, the selecting a median value of the two groups of frequency parameters from the frequency parameter interval including the two groups of frequency parameters as the first frequency parameter may be implemented as: selecting an average value of center frequencies of the two groups of frequency parameters as a center frequency of the first frequency parameter, to obtain the first frequency parameter; or selecting an average value of start frequencies of the two groups of frequency parameters as a start frequency of the first frequency parameter, to obtain the first frequency parameter; or selecting an average value of cutoff frequencies of the two groups of frequency parameters as a cutoff frequency of the first frequency parameter, to obtain the first frequency parameter.

In another embodiment, the selecting a first frequency parameter from a frequency parameter interval including the two groups of frequency parameters may be implemented as: performing interpolation between the two groups of frequency parameters to obtain a plurality of groups of candidate frequency parameters; and selecting, from the plurality of groups of candidate frequency parameters, a candidate frequency parameter with a smallest absolute value of a difference between a filtering output value of the predicted displacement output by the second displacement prediction model and the displacement protection threshold as the first frequency parameter.

In an embodiment, the performing interpolation between the two groups of frequency parameters may be implemented as: performing interpolation on center frequencies of the two groups of frequency parameters, or performing interpolation on start frequencies of the two groups of frequency parameters, or performing interpolation on cutoff frequencies of the two groups of frequency parameters.

In an embodiment, when interpolation is performed between the two groups of frequency parameters, a preset quantity of values may be inserted, or interpolation may be performed based on a preset frequency spacing, or interpolation may be performed in another manner. This is not limited in this embodiment of this application.

In another embodiment, when interpolation is performed between the two groups of frequency parameters, interpolation may be repeatedly performed until a candidate frequency parameter with a filtering output value of the predicted displacement output by the second displacement prediction model equal to the displacement protection threshold is obtained as the first frequency parameter.

In this embodiment of this application, the second displacement prediction model reflects a feature of the speaker more truly, ensures that the output predicted displacement is more accurate, and can further perform displacement protection more accurately. In this way, hardware potentials of the speaker are maximally exploited and loudness of the speaker is improved, while the displacement of the diaphragm of the speaker is protected.

In an embodiment, in this embodiment of this application, the electronic device may further capture a current and voltage of the speaker, obtain an impedance curve, then extract a resonance frequency $f_0$ of the speaker, and calculate real-time mechanical stiffness Kms of the speaker based on the resonance frequency $f_0$ and vibration quality Mms, where Mms is an inherent hardware parameter of the speaker. Then the electronic device updates Kms in the currently used displacement prediction model (that is, the second displacement prediction model) to the real-time Kms, where $Kms=(2*\pi*f_0)^2*Mms$.

Further, as a temperature of the speaker increases, a displacement of the diaphragm of the speaker caused by a same signal also increases. In this embodiment of this application, the electronic device may further correct, based on the temperature, the frequency parameter of the high-pass filter for filtering the second output signal, to ensure that control over the second output signal meets the current feature of the speaker, and further ensure that loudness of the speaker is improved.

In an embodiment, first, the electronic device determines a real-time temperature of the speaker based on impedance of the speaker.

In an embodiment, the real-time temperature T of the speaker may meet the following expression:

$$T = \frac{1}{\sigma}\left(\frac{\text{Re}}{\text{Re}_0} - 1\right) + T_0,$$

where $\sigma$ is a temperature rise coefficient, Re is impedance of the speaker, $\text{Re}_0$ is impedance of the speaker at a room temperature, $T_0$ is a preset room temperature, and $\sigma$ and Re are inherent parameters of the speaker.

Second, the electronic device determines a frequency correction coefficient based on the real-time temperature of the speaker.

The frequency correction coefficient Coeff meets the following expression:

$$Coeff = \frac{T - T_{hot}}{T_{cold} - T_{hot}} * (1 - Coeff_0) + Coeff_0.$$

All parameters in the expression that the frequency correction coefficient Coeff meets are preset values. For example, $T_{hot}$ is a hot state temperature threshold, $T_{cold}$ is a cold state temperature threshold, and $\text{Coeff}_0$ is an initial frequency correction coefficient. Specific values of the preset values are not limited in this embodiment of this application. The frequency correction coefficient Coeff is a frequency offset or a passband offset.

Finally, the electronic device corrects the cutoff frequency parameter based on the frequency correction coefficient, and filters the second output signal by using a corrected frequency parameter. Correcting the cutoff frequency parameter based on the frequency correction coefficient means offsetting, by a value of the frequency correction coefficient, a channel of the high-pass filter indicated by the cutoff frequency parameter, to obtain the corrected frequency parameter.

Figure 20:
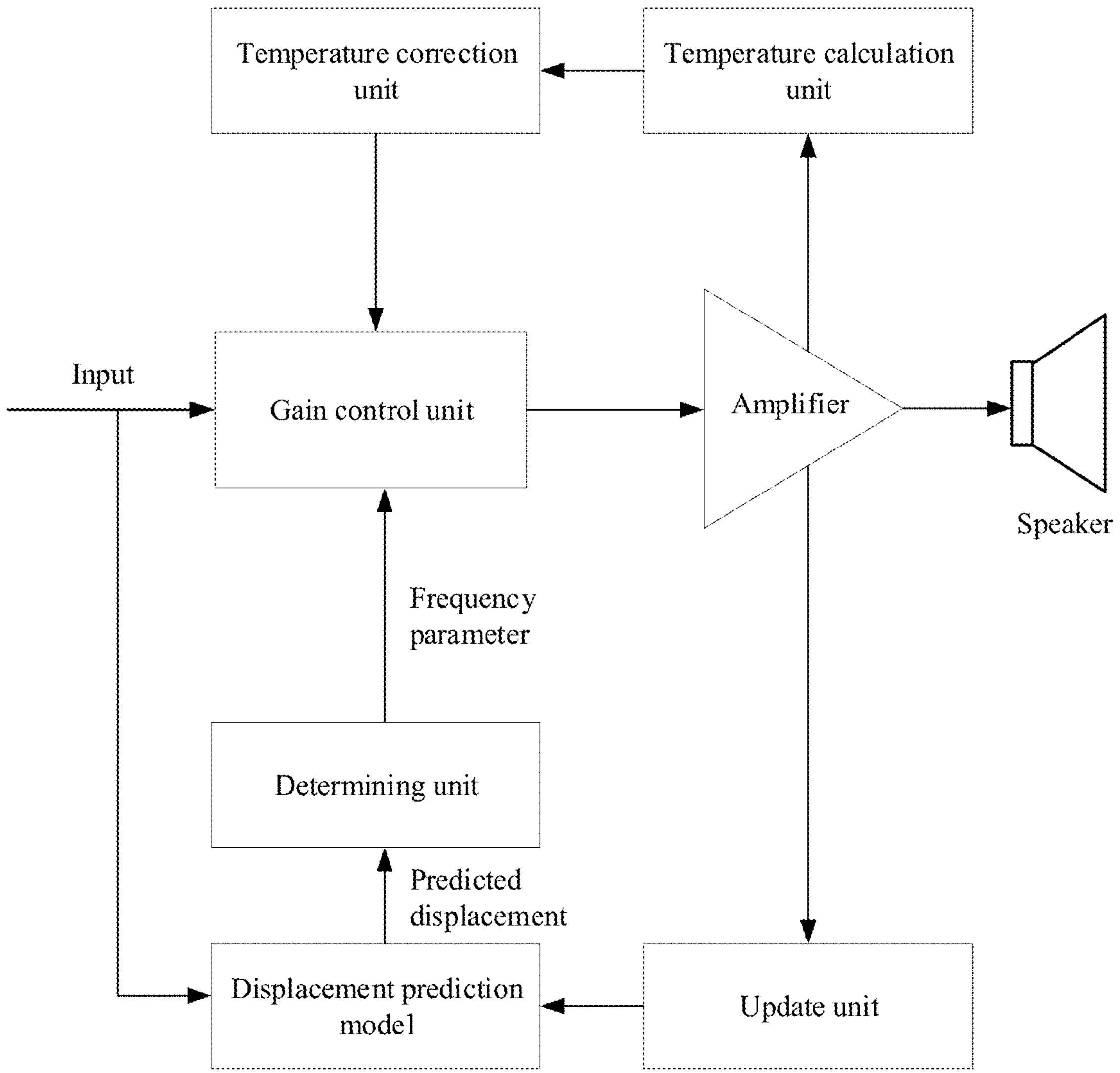
FIG. 20 is a schematic diagram of a framework of another speaker system according to an embodiment of this application.

For example, FIG. 20 shows a framework of a speaker system according to an embodiment of this application. As shown in FIG. 20, the speaker system includes a displacement prediction model (a second displacement prediction model after a correction parameter is adjusted), a gain control unit, a determining unit, a power amplifier unit (amplifier), a temperature calculation unit, and a temperature correction unit. A second output signal is input into the displacement prediction model for outputting a predicted displacement. The determining unit determines a frequency parameter of a high-pass filter. The gain control unit controls a gain of the second output signal and inputs the second output signal to the power amplifier unit. The power amplifier unit converts a digital signal into an analog signal, and inputs the analog signal to a speaker for playing. The temperature calculation unit calculates a real-time temperature of the speaker. The temperature correction unit determines a frequency correction coefficient and inputs the frequency correction coefficient into the gain control unit. The gain control unit corrects a cutoff frequency parameter, where a corrected frequency parameter is used to control the gain of the second output signal.

In an embodiment, in this embodiment of this application, the electronic device performs operation 1901 to operation 1903 to perform gain control on the second output signal of the speaker, to protect the displacement of the speaker. In operation 1901 to operation 1903, the electronic device may further continue to process the output signal, to reduce signal distortion, thereby further improving sound quality of the speaker. It should be noted that, for ease of description, in the following embodiment, output signals obtained after processing in operation 1903 is completed are collectively referred to as a third output signal.

Figure 21:
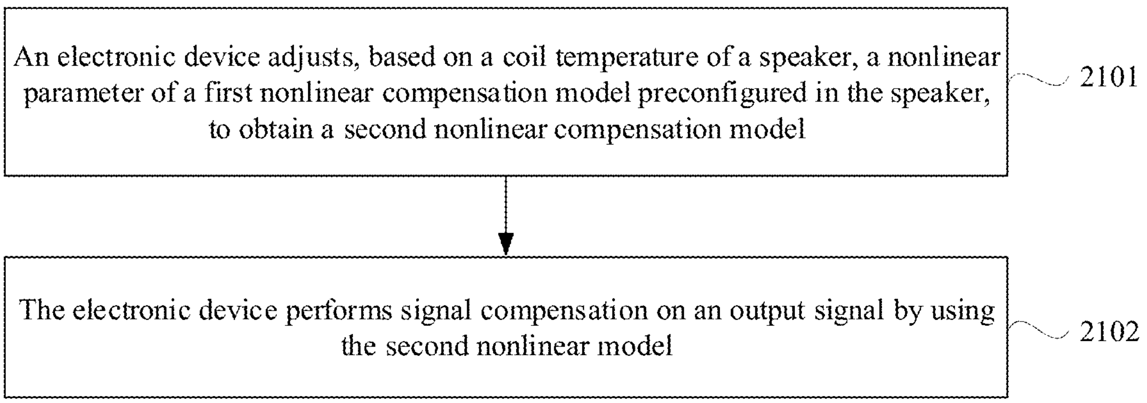
FIG. 21 is a schematic diagram of another method for improving sound quality of a speaker according to an embodiment of this application.

As shown in FIG. 21, after operation 1902, the method for improving sound quality of a speaker according to this embodiment of this application may further include operation 2101 and operation 2102.

Operation 2101: The electronic device adjusts, based on a coil temperature of the speaker, a nonlinear parameter of a first nonlinear compensation model preconfigured in the speaker, to obtain a second nonlinear compensation model.

It should be understood that the nonlinear compensation model of the speaker corresponds to a plurality of nonlinear parameters, and that determining the nonlinear compensation model of the speaker is obtaining the nonlinear parameters of the speaker. In this embodiment of this application, the nonlinear parameter of the speaker includes at least one of a force factor BL, mechanical stiffness Kms, inductance Le, and damping Rm of the speaker.

The nonlinear parameter of the nonlinear compensation model preconfigured in the speaker is referred to as a first nonlinear parameter, and the nonlinear parameter of the obtained second nonlinear compensation model of the speaker is referred to as a second nonlinear parameter.

In this embodiment of this application, the coil temperature of the speaker may be determined based on direct current resistance of the speaker. A relationship between the coil temperature of the speaker (which may also be referred to as a voice coil temperature) and direct current resistance of the coil of the speaker is as follows:

$$T = \frac{1}{\eta}\left(\frac{R}{R_0} - 1\right) + 25,$$

where T is the coil temperature of the speaker (which has the same meaning as the real-time temperature of the speaker), R is the direct current resistance of the coil of the speaker, $\eta$ is the temperature rise coefficient, and $R_0$ is direct current resistance of the coil corresponding to a calibration temperature. Generally, the voice coil temperature is calibrated at 25° C.

In an embodiment, a method for adjusting, by the electronic device based on the coil temperature of the speaker, the nonlinear parameter of the nonlinear compensation model preconfigured in the speaker includes: performing interpolation on the preconfigured nonlinear parameter (that is, the first nonlinear parameter) based on the coil temperature of the speaker, to obtain the second nonlinear parameter of the speaker.

A process of performing interpolation on the first nonlinear parameter is described by using mechanical stiffness Kms in the nonlinear parameter as an example.

First, a characteristic curve of the nonlinear parameter Kms at different temperatures of the coil of the speaker is obtained. The characteristic curve of Kms is a curve reflecting a relationship between a stiffness coefficient of the speaker and a displacement of the speaker. For example, 10 characteristic curves of Kms from 10° C. to 55° C. are obtained at intervals of 5° C., and data of the 10 characteristic curves is stored.

Second, linear interpolation is performed on the characteristic curve of the nonlinear parameter Kms (x) based on the temperature of the coil of the speaker, a temperature threshold 1, and a temperature threshold 2, to obtain a target characteristic curve (the target characteristic curve may be understood as an estimated result of a characteristic curve of a third nonlinear parameter). The temperature threshold 2 is greater than the temperature threshold 1, and the third nonlinear parameter may be understood as a nonlinear parameter corresponding to a current temperature of the coil of the speaker.

For example, the temperature of the coil of the speaker is denoted as T, the temperature threshold 1 is denoted as $T_{min}$, and the temperature threshold 2 is denoted as $T_{max}$.

If $T<T_{min}$, a characteristic curve corresponding to $T_{min}$ is used as the target characteristic curve.

If $T>T_{max}$, a characteristic curve corresponding to $T_{max}$ is used as the target characteristic curve.

If $T_{min}\leq T\leq T_{max}$, linear interpolation is performed, based on the temperature of the coil of the speaker, on the characteristic curve corresponding to $T_{min}$ and the characteristic curve corresponding to $T_{max}$, to generate the target characteristic curve.

Finally, polynomial fitting is performed on the target characteristic curve to obtain coefficients of a polynomial corresponding to the target characteristic curve. The coefficients are in a one-to-one correspondence with nonlinear parameters. In this way, the second nonlinear parameter of the speaker may be determined based on the coefficients of the polynomial.

For example, for the nonlinear parameter Kms, it is assumed that the foregoing fitting binomial is:

$$f(x)=a_0+a_1x+a_2x^2+a_3x^3+a_4x^4,$$

where a coefficient $a_1$ corresponds to a first-order coefficient of the nonlinear parameter Kms, a coefficient $a_2$ corresponds to a second-order coefficient of the nonlinear parameter Kms, a coefficient $a_3$ corresponds to a third-order coefficient of the nonlinear parameter Kms, and a coefficient $a_4$ corresponds to a fourth-order coefficient of the nonlinear parameter Kms.

Another type of parameter in the nonlinear parameter, for example, Rm (v), may also be obtained by using a method similar to the foregoing linear interpolation method. Details are not described again in this embodiment of this application.

In an embodiment, the characteristic curve of the nonlinear parameter may be data in a table form, or may be data or a file in another form. This is not limited in this embodiment of this application.

It should be understood that the nonlinear parameter of the speaker may change in real time. For example, the nonlinear parameter changes with the voice coil temperature of the speaker. In this embodiment of this application, interpolation is performed on the first nonlinear parameter of the speaker based on a current temperature of the speaker, so that the nonlinear parameter of the speaker can be adjusted in real time to obtain the second nonlinear parameter. Therefore, accuracy of the second nonlinear parameter is high.

It should be understood that the nonlinear parameter of the speaker may further change with the displacement of the speaker. In this embodiment of this application, a similar linear interpolation method may be used to determine the displacement of the speaker based on the direct current resistance of the speaker, and then interpolation is performed on the first nonlinear parameter of the speaker based on the displacement of the speaker, to obtain the second nonlinear parameter of the speaker, so as to obtain the nonlinear model of the speaker.

Operation 2102: The electronic device performs signal compensation on the output signal by using the second nonlinear model.

In this embodiment of this application, because accuracy of the determined second nonlinear parameter of the speaker is high, signal compensation is performed on the third output signal based on the second nonlinear parameter, and a signal compensation effect is good. This can effectively reduce signal distortion and improve sound quality of the speaker.

In an embodiment, the method for improving sound quality of a speaker according to this embodiment of this application further includes: filtering a compensated third output signal.

In this embodiment of this application, a wavetrap may be used to filter the compensated third output signal. In this way, a speed of the diaphragm of the speaker near the resonance frequency can be adjusted, further, distortion of the output signal is reduced, and sound quality of the speaker can be effectively improved.

As can be learned from above, in this embodiment of this application, a series of processing, for example, equalization processing, bass enhancement, transient enhancement, virtual bass processing, displacement control, and nonlinear compensation, may be sequentially performed on an audio signal to be played by the speaker. In an embodiment, for some large-sized speakers with relatively strong low-frequency capabilities, the foregoing virtual bass processing and/or non-linear compensation process may not be performed.

Figure 22:
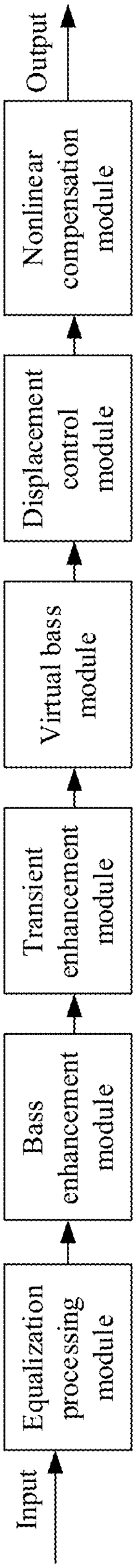
FIG. 22 is a schematic diagram of a framework of another speaker system according to an embodiment of this application.

For example, FIG. 22 is a schematic diagram of a framework of a speaker system according to an embodiment of this application. As shown in FIG. 22, the speaker system may include an equalization processing module, a bass enhancement module, a transient enhancement module, a virtual bass module, a displacement control module, and a nonlinear compensation module. The equalization processing module is configured to perform operation 1401. The bass enhancement module is configured to perform operation 1402. The transient enhancement module is configured to perform operation 401 to operation 404. The virtual bass module is configured to perform operation 1701 to operation 1705. The displacement control module is configured to perform operation 1901 to operation 1903. The nonlinear compensation module is configured to perform operation 2101 and operation 2102.

Correspondingly, an embodiment of this application provides an electronic device. The electronic device may be divided into functional modules based on the foregoing method examples. For example, the functional modules may be obtained through division in a one-to-one correspondence with functions, or two or more functions may be integrated into one processing module. The integrated module may be implemented in a form of hardware, or may be implemented in a form of a software functional module. It should be noted that in embodiments of the present invention, module division is an example, and is merely logical function division. During actual implementation, another division manner may be used.

Figure 23:
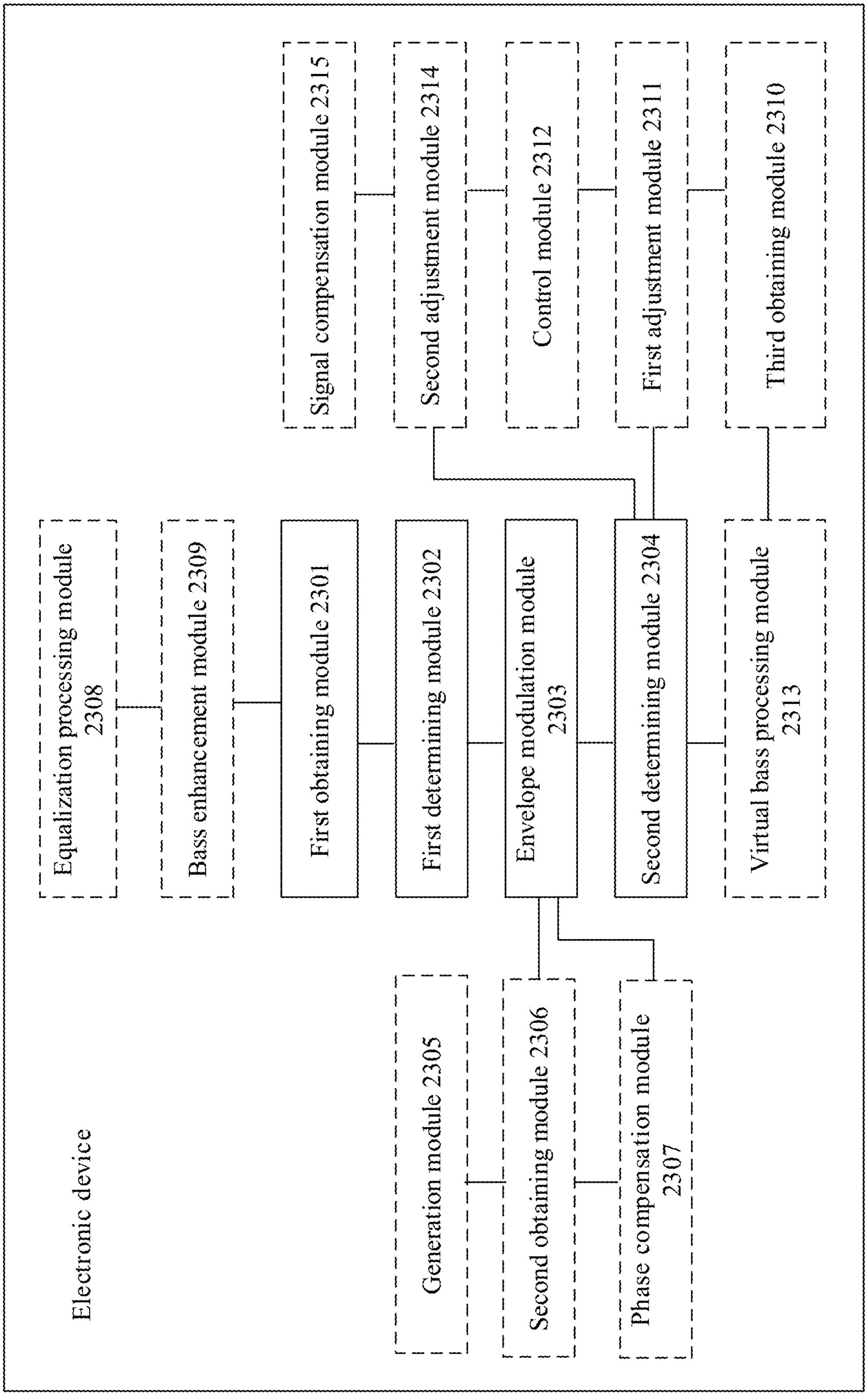
FIG. 23 is a first schematic diagram of a structure of an electronic device according to an embodiment of this application.

When the functional modules are obtained through division in the one-to-one correspondence with the functions, FIG. 23 is a schematic diagram of a possible structure of the electronic device in the foregoing embodiment. As shown in FIG. 23, the electronic device includes a first obtaining module 2301, a first determining module 2302, an envelope modulation module 2303, and a second determining module 2304.

The first obtaining module 2301 is configured to perform frequency division on an input signal of a speaker to obtain a first low-frequency input signal and a first high-frequency input signal, where the input signal of the speaker is a time domain signal, the first low-frequency input signal includes a signal whose frequency is lower than a first preset frequency in the input signal, and the first high-frequency input signal includes a signal whose frequency is higher than the first preset frequency in the input signal; for example, perform operation 401 in the foregoing method embodiment.

The first determining module 2302 is configured to perform transient detection on the first low-frequency input signal to determine whether the first low-frequency input signal is a transient signal, for example, perform operation 402 in the foregoing method embodiment (including operation 4021 to operation 4023).

If the first low-frequency input signal is a transient signal, the envelope modulation module 2303 is configured to perform signal envelope modulation on the first low-frequency input signal to obtain a second low-frequency input signal, where a startup voltage of the second low-frequency input signal is higher than a startup voltage of the first low-frequency input signal, and loudness of the second low-frequency input signal is greater than loudness of the first low-frequency input signal; for example, perform operation 403 in the foregoing method embodiment.

The second determining module 2304 is configured to determine an output signal of the speaker based on the second low-frequency input signal and the first high-frequency input signal, for example, perform operation 404 in the foregoing method embodiment.

In an embodiment, the first obtaining module 2301 is further configured to perform frequency division on the first high-frequency input signal of the speaker to obtain a first intermediate-frequency input signal and a second high-frequency input signal, where the first intermediate-frequency input signal includes a signal whose frequency is lower than a second preset frequency in the first high-frequency input signal, the second high-frequency input signal includes a signal whose frequency is higher than the second preset frequency in the first high-frequency input signal, and the second preset frequency is higher than the first preset frequency; for example, perform operation 405 in the foregoing method embodiment.

The first determining module 2302 is further configured to perform transient detection on the first intermediate-frequency input signal to determine whether the first intermediate-frequency input signal is a transient signal, for example, perform operation 406 in the foregoing method embodiment.

If the first intermediate-frequency input signal is a transient signal, the envelope modulation module 2303 is further configured to perform signal envelope modulation on the first intermediate-frequency input signal to obtain a second intermediate-frequency input signal, where a startup voltage of the second intermediate-frequency input signal is higher than a startup voltage of the first intermediate-frequency input signal, and loudness of the second intermediate-frequency input signal is greater than loudness of the first intermediate-frequency input signal; for example, perform operation 407 in the foregoing method embodiment.

The second determining module 2304 is configured to obtain the output signal of the speaker based on the second low-frequency input signal, the second intermediate-frequency input signal, and the second high-frequency input signal, for example, perform operation 408 in the foregoing method embodiment.

In an embodiment, the electronic device provided in this embodiment of this application further includes a generation module 2305 and a second obtaining module 2306. The generation module 2305 is configured to generate a low-frequency auxiliary signal, for example, perform operation 409 in the foregoing method embodiment. The second obtaining module 2306 is configured to add the low-frequency auxiliary signal to the first low-frequency input signal to obtain a first auxiliary enhanced signal, for example, perform operation 410 in the foregoing method embodiment. The envelope modulation module 2303 is configured to perform signal envelope modulation on the first auxiliary enhanced signal to obtain the second low-frequency input signal, for example, perform operation 4031 in the foregoing method embodiment.

In an embodiment, the electronic device provided in this embodiment of this application further includes a phase compensation module 2307. The phase compensation module 2307 is configured to perform phase compensation on the first low-frequency input signal to obtain a first phase-compensated signal, for example, perform operation 411 in the foregoing method embodiment. The envelope modulation module 2303 is configured to perform signal envelope modulation on the first phase-compensated signal to obtain the second low-frequency input signal, for example, perform operation 4032 in the foregoing method embodiment.

In an embodiment, the electronic device provided in this embodiment of this application further includes an equalization processing module 2308 and a bass enhancement module 2309. The equalization processing module 2308 is configured to perform equalization processing on a first signal to obtain a second signal, where the first signal is an initial to-be-played signal that is input to the speaker, for example, perform operation 1401 in the foregoing method embodiment. The bass enhancement module 2309 is configured to process the second signal by using a bass enhancement algorithm, to obtain the input signal of the speaker, for example, perform operation 1402 (including operation 1402*a* and operation 1402*b*) in the foregoing method embodiment.

In an embodiment, the electronic device provided in this embodiment of this application further includes a third obtaining module 2310, a first adjustment module 2311, and a control module 2312. The third obtaining module 2310 is configured to obtain a first displacement prediction model including one or more correction coefficients, where the first displacement prediction model is used to simulate performance of the speaker to predict a displacement of a diaphragm of the speaker, and the one or more correction coefficients are used to control an output of the first displacement prediction model; for example, perform operation 1901 in the foregoing method embodiment. The first adjustment module 2311 is configured to adjust at least one correction coefficient in the first displacement prediction model to obtain a second displacement prediction model, where an absolute value of a difference between a predicted displacement output by the second displacement prediction model and an actual displacement of the diaphragm is less than an absolute value of a difference between a predicted displacement output by the first displacement prediction model and the actual displacement of the diaphragm of the speaker, and the actual displacement of the diaphragm of the speaker is an actual measured value of a movement distance of the diaphragm of the speaker relative to an initial location; for example, perform operation 1902 in the foregoing method embodiment. The control module 2312 is configured to control a gain of the output signal based on a displacement protection threshold of the speaker and the predicted displacement output by the second displacement prediction model, so that a displacement of the diaphragm when the speaker plays the output signal is less than or equal to the displacement protection threshold, where the displacement protection threshold is a maximum displacement of the diaphragm of the speaker; for example, perform operation 1903 in the foregoing method embodiment.

In an embodiment, the electronic device provided in this embodiment of this application further includes a virtual bass processing module 2313. The virtual bass processing module 2313 is configured to perform virtual bass processing on the output signal of the speaker to obtain a virtual bass output signal, where psychologically perceived low-frequency loudness of the virtual bass output signal is greater than psychologically perceived low-frequency loudness of the output signal of the speaker; for example, perform operation 1701 to operation 1705 in the foregoing method embodiment.

In an embodiment, the electronic device provided in this embodiment of this application further includes a second adjustment module 2314 and a signal compensation module 2315. The second adjustment module 2314 is configured to adjust, based on a coil temperature of the speaker, a nonlinear parameter of a first nonlinear compensation model preconfigured in the speaker, to obtain a second nonlinear compensation model, for example, perform operation 2101 in the foregoing method embodiment. The signal compensation module 2315 is configured to perform signal compensation on the output signal by using the second nonlinear compensation model, for example, perform operation 2102 in the foregoing method embodiment.

The modules of the electronic device may be further configured to perform other actions in the foregoing method embodiments. All related content of the operations in the foregoing method embodiments may be cited in function descriptions of corresponding functional modules, and details are not described herein again.

Figure 24:
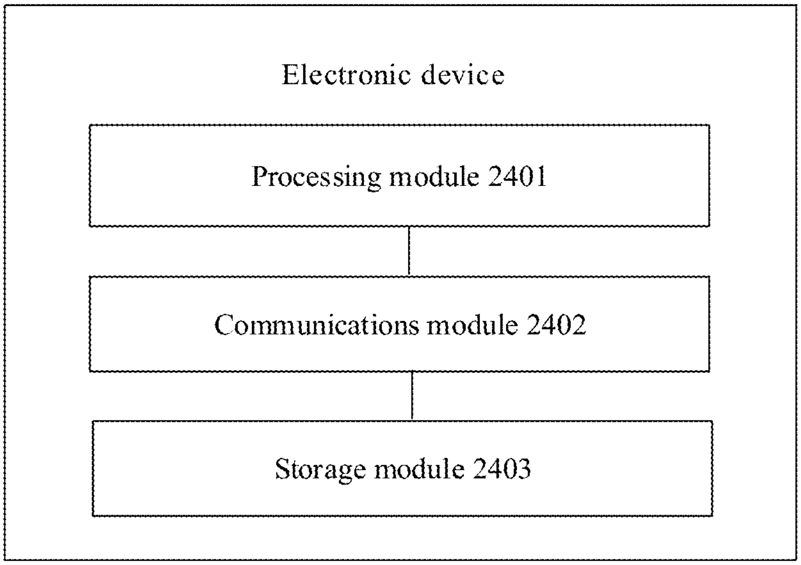
FIG. 24 is a second schematic diagram of a structure of an electronic device according to an embodiment of this application.

When an integrated unit is used, FIG. 24 is a schematic diagram of a possible structure of the electronic device in the foregoing embodiment. As shown in FIG. 24, the electronic device provided in this embodiment of this application may include a processing module 2401 and a communications module 2402. The processing module 2401 may be configured to control and manage an action of the electronic device. For example, the processing module 2401 may be configured to support the electronic device in performing operation 401 to operation 411, operation 1701 to operation 1705, operation 1901 to operation 1903, and operation 2101 and operation 2102 in the foregoing method embodiments, and/or configured for another process of the technology described in this specification. The communications module 2402 may be configured to support the electronic device in communicating with another network entity. In an embodiment, as shown in FIG. 24, the electronic device may further include a storage module 2403, configured to store program code and data of the electronic device.

The processing module 2401 may be a processor or a controller (for example, may be the processor 310 shown in FIG. 3), for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing module may implement or perform various example logical blocks, modules, and circuits described with reference to content disclosed in the embodiments of the present invention. The processor may be a combination that implements a computing function, for example, a combination of one or more microprocessors, or a combination of a DSP and a microprocessor. The communications module 2402 may be a transceiver, a transceiver circuit, a communications interface, or the like (for example, may be the mobile communications module 350 or the wireless communications module 360 shown in FIG. 3). The storage module 2403 may be a memory (for example, may be the internal memory 321 shown in FIG. 3).

When the processing module 2401 is a processor, and the communications module 2402 is a transceiver, and the storage module 2403 is a memory, the processor, the transceiver, and the memory may be connected by a bus. The bus may be a peripheral component interconnect (PCI) bus, an extended industry standard architecture (EISA) bus, or the like. Buses may be classified into an address bus, a data bus, a control bus, and the like.

For more details about implementation of the foregoing functions by the modules included in the electronic device, refer to the descriptions in the foregoing method embodiments. Details are not described herein again.

Embodiments in this specification are all described in a progressive manner. For same or similar parts in embodiments, refer to these embodiments. Each embodiment focuses on a difference from other embodiments.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

Based on the foregoing descriptions of embodiments, a person skilled in the art may clearly understand that, for the purpose of convenient and brief description, division into the foregoing functional modules is used as an example for illustration. In actual application, the foregoing functions can be allocated to different modules and implemented based on a requirement, that is, an internal structure of an apparatus is divided into different functional modules to implement all or some of the functions described above. For a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or some of the operations of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for improving sound quality of a speaker, comprising:

performing frequency division on an input signal of the speaker to obtain a first low-frequency input signal and a first high-frequency input signal, wherein the input signal of the speaker is a time domain signal, the first low-frequency input signal comprises a signal having a frequency lower than a first preset frequency in the input signal, and the first high-frequency input signal comprises a signal having a frequency higher than the first preset frequency in the input signal;

performing transient detection on the first low-frequency input signal to determine whether the first low-frequency input signal is a transient signal;

in response to determining that the first low-frequency input signal is the transient signal, performing signal envelope modulation on the first low-frequency input signal to obtain a second low-frequency input signal, wherein a startup voltage of the second low-frequency input signal is higher than a startup voltage of the first low-frequency input signal, and loudness of the second low-frequency input signal is greater than loudness of the first low-frequency input signal; and determining an output signal of the speaker based on the second low-frequency input signal and the first high-frequency input signal.

2. The method according to claim 1, further comprising:

performing frequency division on the first high-frequency input signal of the speaker to obtain a first intermediate-frequency input signal and a second high-frequency input signal, wherein the first intermediate-frequency input signal comprises a signal having a frequency lower than a second preset frequency in the first high-frequency input signal, the second high-frequency input signal comprises a signal having a frequency higher than the second preset frequency in the first high-frequency input signal, and the second preset frequency is higher than the first preset frequency;

performing transient detection on the first intermediate-frequency input signal to determine whether the first intermediate-frequency input signal is a transient signal; and in response to determining that the first intermediate-frequency input signal is the transient signal, performing signal envelope modulation on the first intermediate-frequency input signal to obtain a second intermediate-frequency input signal, wherein a startup voltage of the second intermediate-frequency input signal is higher than a startup voltage of the first intermediate-frequency input signal, and loudness of the second intermediate-frequency input signal is greater than loudness of the first intermediate-frequency input signal;

wherein determining the output signal of the speaker comprises:

obtaining the output signal of the speaker based on the second low-frequency input signal, the second intermediate-frequency input signal, and the second high-frequency input signal.

3. The method according to claim 1, wherein the first low-frequency input signal is the transient signal;

the method further comprises: before performing the signal envelope modulation on the first low-frequency input signal, generating a low-frequency auxiliary signal; and
adding the low-frequency auxiliary signal to the first low-frequency input signal to obtain a first auxiliary enhanced signal; and
performing the signal envelope modulation on the first low-frequency input signal to obtain the second low-frequency input signal comprises:
performing signal envelope modulation on the first auxiliary enhanced signal to obtain the second low-frequency input signal.

4. The method according to claim 3, wherein generating the low-frequency auxiliary signal comprises:
generating a first auxiliary signal, wherein the first auxiliary signal meets:

$$signal\_h = e^{-A} \times \sin(2\pi f),$$

wherein signal_h represents the low-frequency auxiliary signal, A represents a signal amplitude influencing factor, and f is a center frequency of the speaker; and
performing high-pass filtering on the first auxiliary signal to obtain the low-frequency auxiliary signal.

5. The method according to claim 1, wherein
the first low-frequency input signal is the transient signal;
the method further comprises:
before the performing signal envelope modulation on the first low-frequency input signal, performing phase compensation on the first low-frequency input signal to obtain a first phase-compensated signal; and
performing the signal envelope modulation on the first low-frequency input signal to obtain the second low-frequency input signal comprises:
performing signal envelope modulation on the first phase-compensated signal to obtain the second low-frequency input signal.

6. The method according to claim 1, wherein performing the transient detection on the first low-frequency input signal comprises:
determining transient power and steady-state power of the first low-frequency input signal;
determining an instantaneous rate of the first low-frequency input signal based on the transient power and the steady-state power of the first low-frequency input signal, wherein the instantaneous rate of the first low-frequency input signal meets: $T_r=(R_r-1)^2\times W$, wherein $T_r$ represents the instantaneous rate of the first low-frequency input signal, $R_r$ represents a ratio of the transient power of the first low-frequency input signal to the steady-state power of the first low-frequency input signal, W represents a weighting factor, and W is a value of a current power of the first low-frequency input signal; and
in response to determining that a transient rate of the input signal is greater than a preset transient rate threshold, determining that the first low-frequency input signal is the transient signal.

7. The method according to claim 1, further comprising:
performing equalization processing on a first signal to obtain a second signal, wherein the first signal is an initial to-be-played signal that is input to the speaker; and
processing the second signal by using a bass enhancement algorithm, to obtain the input signal of the speaker.

8. The method according to claim 7, wherein processing the second signal comprises:
determining a gain of a low-frequency shelving filter based on energy of a low-frequency signal in the second signal, wherein the low-frequency shelving filter is configured to control loudness of the low-frequency signal in the second signal; and
filtering the second signal by using the low-frequency shelving filter, to obtain the input signal of the speaker.

9. The method according to claim 1, further comprising:
obtaining a first displacement prediction model comprising one or more correction coefficients, wherein the first displacement prediction model is used to simulate performance of the speaker to predict a displacement of a diaphragm of the speaker, and the one or more correction coefficients are used to control an output of the first displacement prediction model;
adjusting at least one correction coefficient in the first displacement prediction model to obtain a second displacement prediction model, wherein an absolute value of a difference between a predicted displacement output by the second displacement prediction model and an actual displacement of the diaphragm is less than an absolute value of a difference between a predicted displacement output by the first displacement prediction model and the actual displacement, and the actual displacement is a measured value of a movement distance of the diaphragm relative to an initial location; and
controlling a gain of the output signal based on a displacement protection threshold of the speaker and the predicted displacement output by the second displacement prediction model, so that a displacement of the diaphragm when the speaker plays the output signal is less than or equal to the displacement protection threshold, wherein the displacement protection threshold is a maximum displacement of the diaphragm.

10. The method according to claim 1, further comprising:
performing virtual bass processing on the output signal to obtain a virtual bass output signal, wherein psychologically perceived low-frequency loudness of the virtual bass output signal is greater than psychologically perceived low-frequency loudness of the output signal.

11. The method according to claim 10, wherein performing the virtual bass processing on the output signal comprises:
performing frequency division processing on the output signal to obtain a first low-frequency output signal and a first high-frequency output signal, wherein the first low-frequency output signal comprises a signal having a frequency lower than a third preset frequency in the output signal, and the first high-frequency output signal comprises a signal having a frequency higher than the third preset frequency in the output signal;
generating a harmonic signal of the first low-frequency output signal based on the first low-frequency output signal;
mixing the harmonic signal and the first low-frequency output signal to obtain a first mixed signal;
performing phase synchronization processing on the first mixed signal and the first high-frequency output signal to obtain a second mixed signal and a second high-frequency output signal, wherein a phase variation of the second mixed signal is equal to a phase variation of the second high-frequency output signal; and
obtaining the virtual bass output signal based on the second mixed signal and the second high-frequency output signal.

12. The method according to claim 1, further comprising:
adjusting a nonlinear parameter of a first nonlinear compensation model preconfigured in the speaker based on a coil temperature of the speaker, to obtain a second nonlinear compensation model; and performing signal compensation on the output signal by using the second nonlinear compensation model.

13. An electronic device, comprising:

at least one processor; and a memory coupled to the at least one processor to store instructions, which when executed by the at least one processor, cause the at least one processor to perform operations, the operations comprising:

performing frequency division on an input signal of a speaker to obtain a first low-frequency input signal and a first high-frequency input signal, wherein the input signal of the speaker is a time domain signal, the first low-frequency input signal comprises a signal having a frequency lower than a first preset frequency in the input signal, and the first high-frequency input signal comprises a signal having a frequency higher than the first preset frequency in the input signal;

performing transient detection on the first low-frequency input signal to determine whether the first low-frequency input signal is a transient signal;

in response to determining that the first low-frequency input signal is the transient signal, performing signal envelope modulation on the first low-frequency input signal to obtain a second low-frequency input signal, wherein a startup voltage of the second low-frequency input signal is higher than a startup voltage of the first low-frequency input signal, and loudness of the second low-frequency input signal is greater than loudness of the first low-frequency input signal; and determining an output signal of the speaker based on the second low-frequency input signal and the first high-frequency input signal.

14. The electronic device according to claim 13, wherein the operations further comprise:

performing frequency division on the first high-frequency input signal to obtain a first intermediate-frequency input signal and a second high-frequency input signal, wherein the first intermediate-frequency input signal comprises a signal having a frequency lower than a second preset frequency in the first high-frequency input signal, the second high-frequency input signal comprises a signal having a frequency higher than the second preset frequency in the first high-frequency input signal, and the second preset frequency is higher than the first preset frequency;

performing transient detection on the first intermediate-frequency input signal to determine whether the first intermediate-frequency input signal is the transient signal; and in response to determining that the first intermediate-frequency input signal is the transient signal, performing signal envelope modulation on the first intermediate-frequency input signal to obtain a second intermediate-frequency input signal, wherein a startup voltage of the second intermediate-frequency input signal is higher than a startup voltage of the first intermediate-frequency input signal, and loudness of the second intermediate-frequency input signal is greater than loudness of the first intermediate-frequency input signal;

determining the output signal of the speaker comprises:

obtaining the output signal of the speaker based on the second low-frequency input signal, the second intermediate-frequency input signal, and the second high-frequency input signal.

15. The electronic device according to claim 13, wherein the first low-frequency input signal is the transient signal;

the operations further comprise: before performing the signal envelope modulation on the first low-frequency input signal, generating a low-frequency auxiliary signal; and adding the low-frequency auxiliary signal to the first low-frequency input signal to obtain a first auxiliary enhanced signal; and performing the signal envelope modulation on the first low-frequency input signal to obtain the second low-frequency input signal comprises:

performing signal envelope modulation on the first auxiliary enhanced signal to obtain the second low-frequency input signal.

16. The electronic device according to claim 15, wherein generating the low-frequency auxiliary signal comprises:

generating a first auxiliary signal, wherein the first auxiliary signal meets:

$$signal\_h = e^{-A} \times \sin(2\pi f),$$

wherein signal_h represents the low-frequency auxiliary signal, A represents a signal amplitude influencing factor, and f is a center frequency of the speaker; and performing high-pass filtering on the first auxiliary signal to obtain the low-frequency auxiliary signal.

17. The electronic device according to claim 13, wherein the first low-frequency input signal is the transient signal;

the operations further comprise:

before performing the signal envelope modulation on the first low-frequency input signal, performing phase compensation on the first low-frequency input signal to obtain a first phase-compensated signal; and performing the signal envelope modulation on the first low-frequency input signal to obtain the second low-frequency input signal comprises:

performing signal envelope modulation on the first phase-compensated signal to obtain the second low-frequency input signal.

18. The electronic device according to claim 13, wherein performing the transient detection on the first low-frequency input signal comprises:

determining transient power and steady-state power of the first low-frequency input signal;

determining an instantaneous rate of the first low-frequency input signal based on the transient power and the steady-state power of the first low-frequency input signal, wherein the instantaneous rate of the first low-frequency input signal meets: $T_r=(R_r-1)^2\times W$, wherein $T_r$ represents the instantaneous rate of the first low-frequency input signal, $R_r$ represents a ratio of the transient power of the first low-frequency input signal to the steady-state power of the first low-frequency input signal, W represents a weighting factor, and W is a value of a current power of the first low-frequency input signal; and in response to determining that a transient rate of the input signal is greater than a preset transient rate threshold, determining that the first low-frequency input signal is the transient signal.

19. The electronic device according to claim 13, wherein the operations further comprise:

performing equalization processing on a first signal to obtain a second signal, wherein the first signal is an initial to-be-played signal that is input to the speaker; and processing the second signal by using a bass enhancement algorithm, to obtain the input signal of the speaker.

20. A non-transitory computer-readable storage medium having a computer program stored therein, which when executed by a processor, causes the processor to perform operations, the operations comprising:

performing frequency division on an input signal of a speaker to obtain a first low-frequency input signal and a first high-frequency input signal, wherein the input signal of the speaker is a time domain signal, the first low-frequency input signal comprises a signal having a frequency lower than a first preset frequency in the input signal, and the first high-frequency input signal comprises a signal having a frequency higher than the first preset frequency in the input signal;

performing transient detection on the first low-frequency input signal to determine whether the first low-frequency input signal is a transient signal;

in response to determining that the first low-frequency input signal is the transient signal, performing signal envelope modulation on the first low-frequency input signal to obtain a second low-frequency input signal, wherein a startup voltage of the second low-frequency input signal is higher than a startup voltage of the first low-frequency input signal, and loudness of the second low-frequency input signal is greater than loudness of the first low-frequency input signal; and determining an output signal of the speaker based on the second low-frequency input signal and the first high-frequency input signal.

* * * * *